US012754570B2

(12) United States Patent
Groden et al.

(10) Patent No.: US 12,754,570 B2
(45) Date of Patent: Oct. 6, 2026

(54) AUTOMATED AND USER ASSISTED AUTOROTATION FOR AIR VEHICLE

(71) Applicant: Skyryse, Inc., El Segundo, CA (US)

(72) Inventors: Mark Daniel Groden, Marina del Rey, CA (US); Will Fulton, El Segundo, CA (US); Rushabh Chandrakant Patel, Los Angeles, CA (US); Justin Mark Ryan, Rancho Palos Verdes, CA (US)

(73) Assignee: Skyryse, Inc., El Segundo, CA (US)

( * ) Notice: Subject to any disclaimer, the term of this patent is extended or adjusted under 35 U.S.C. 154(b) by 40 days.

(21) Appl. No.: 18/771,987

(22) Filed: Jul. 12, 2024

(65) Prior Publication Data

US 2025/0019070 A1 Jan. 16, 2025

Related U.S. Application Data

(60) Provisional application No. 63/580,415, filed on Sep. 4, 2023, provisional application No. 63/526,747, filed on Jul. 14, 2023.

(51) Int. Cl.

| | |
|---|---|
| ***G05D 1/85*** | (2024.01) |
| ***B64C 27/00*** | (2006.01) |
| ***B64C 27/04*** | (2006.01) |
| ***B64C 27/57*** | (2006.01) |
| ***B64D 43/00*** | (2006.01) |
| ***G05D 1/654*** | (2024.01) |
| ***G05D 109/25*** | (2024.01) |

(52) U.S. Cl.

CPC ........... *G05D 1/854* (2024.01); *B64C 27/006* (2013.01); *B64C 27/57* (2013.01); *B64D 43/00* (2013.01); *G05D 1/6546* (2024.01); *G05D 1/852* (2024.01); *B64C 27/04* (2013.01); *G05D 2109/25* (2024.01)

(58) Field of Classification Search

CPC ..... B64C 27/006; B64C 29/0033; F02K 9/24; G05D 1/105; G05D 1/0858; G05D 1/854; B64D 27/357; B64D 31/18; B64D 27/32; G08G 5/53; G08G 5/57; F02D 29/02

See application file for complete search history.

(56) References Cited

U.S. PATENT DOCUMENTS

| | | | |
|---|---|---|---|
| 8,744,903 | B2 | 6/2014 | Waguet et al. |
| 9,824,595 | B1 | 11/2017 | Pate |
| 10,922,954 | B2 | 2/2021 | Becker et al. |

(Continued)

OTHER PUBLICATIONS

Hinman, B., "Autorotation for Electric Rotorcraft: The Recipe," Medium.com, Apr. 24, 2023, pp. 1-11.

(Continued)

*Primary Examiner* — Yuri Kan

(74) *Attorney, Agent, or Firm* — Fenwick & West LLP

(57) ABSTRACT

An emergency module may determine the occurrence of an autorotation condition for a rotary wing air vehicle controlled by a user. The emergency module may, responsive to determining the occurrence of the autorotation condition, control the air vehicle to enter into an autorotation. The emergency module may perform one or more non-user actions during the autorotation to assist the user with the autorotation. The emergency module may, while performing the one or more non-user actions during the autorotation, allow the user to maneuver the air vehicle by interacting one or more control interfaces of the air vehicle.

20 Claims, 22 Drawing Sheets

(56) References Cited

U.S. PATENT DOCUMENTS

| | | | |
|---|---|---|---|
| 11,634,235 B1 | 4/2023 | Hinman et al. | |
| 12,260,769 B1 | 3/2025 | Suiter et al. | |
| 2010/0004803 A1 | 1/2010 | Manfredi et al. | |
| 2013/0221153 A1* | 8/2013 | Worsham, II | G05D 1/105 244/17.13 |
| 2014/0054411 A1* | 2/2014 | Connaulte | B64D 27/32 244/17.13 |
| 2014/0117148 A1* | 5/2014 | Dyrla | B64D 31/18 244/17.13 |
| 2014/0343829 A1* | 11/2014 | Park | F02D 29/02 701/110 |
| 2016/0378121 A1 | 12/2016 | Shue | |
| 2017/0017241 A1 | 1/2017 | Gillett, Jr. et al. | |
| 2017/0369160 A1* | 12/2017 | White | G05D 1/0858 |
| 2018/0319486 A1* | 11/2018 | Elyashiv | F02K 9/24 |
| 2019/0031330 A1* | 1/2019 | Groden | G05D 1/105 |
| 2020/0234562 A1 | 7/2020 | Becker et al. | |
| 2021/0403153 A1* | 12/2021 | Anderson | B64C 29/0033 |
| 2022/0005363 A1 | 1/2022 | Suiter et al. | |
| 2022/0011783 A1* | 1/2022 | Groden | G08G 5/53 |
| 2022/0130261 A1 | 4/2022 | Zhong et al. | |
| 2022/0130264 A1* | 4/2022 | Krawiec | G08G 5/57 |
| 2022/0406201 A1 | 12/2022 | Johnson et al. | |
| 2023/0025154 A1 | 1/2023 | Kumar | |
| 2023/0373648 A1 | 11/2023 | Neis et al. | |
| 2025/0019089 A1* | 1/2025 | Groden | G05D 1/854 |
| 2025/0042564 A1* | 2/2025 | Heel | B64D 27/357 |

OTHER PUBLICATIONS

Patent Cooperation Treaty, International Search Report and Written Opinion, PCT Application No. PCT/US2024/037865, Sep. 11, 2025, 15 pages.

United States Office Action, U.S. Appl. No. 17/370,415, filed Apr. 4, 2023, 34 pages.

United States Office Action, U.S. Appl. No. 18/771,968 dated Jan. 8, 2026, 37 pages.

* cited by examiner

Display Interface
805

Display Interface
810

Display Interface
815

900

900

AUTOMATED AND USER ASSISTED AUTOROTATION FOR AIR VEHICLE

CROSS REFERENCE TO RELATED APPLICATIONS

This application claims a benefit of, and priority to, U.S. Patent Application Ser. No. 63/526,747, filed Jul. 14, 2023, and U.S. Patent Application Ser. No. 63/580,415, filed Sep. 4, 2023, the contents of each being incorporated by reference herein.

TECHNICAL FIELD

The disclosure generally relates to emergency management of (e.g., air) vehicles (e.g., fixed wing and rotary wing air vehicles), and more specifically, to autorotation for rotary wing air vehicles.

BACKGROUND

During emergency aviation situations, pilots often misinterpret the situation or fail to perform the correct emergency corrective actions (or fail to perform the corrective actions at the proper time). The National Transportation Safety Board (NTSB) and the Federal Aviation Administration (FAA) cite this as a common problem and top contributor to aviation accidents and fatalities. Previous emergency management solutions for air vehicles largely include visual and aural crew alerting aligned with regulatory certification standards. These warning and caution notifications still mandate a series of highly accurate, memory recalled, and perishable pilot skill tasks in order to effectively mitigate the emergency in an effective manner.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed is a system (and method and non-transitory computer readable storage medium comprising stored program code for autorotation management. By way of example, a system is configured to determine an occurrence of an autorotation condition for a rotary wing air vehicle controlled by a user. The system controls the air vehicle to enter into an autorotation in response to a determination of the occurrence of the autorotation condition. The system performs one or more non-user actions during the autorotation to assist the user with the autorotation. Examples of non-user actions may include maintaining a rotations per minute (RPM) of a rotor of the air vehicle or maintaining an airspeed of the air vehicle to a range of nominal values. While performing the one or more non-user actions during the autorotation, the system allows the user to maneuver the air vehicle by interacting one or more control interfaces of the air vehicle.

Also disclosed is a system (and method and non-transitory computer readable storage medium comprising stored program code) for automated and user assisted air vehicle emergency management. By way of example, the system determines an occurrence of emergency events of a vehicle traversing through a physical environment. The system ranks the emergency events according to importance level associated with each emergency event. The system selects an emergency event based on the ranking and notifies a user of the vehicle of the selected emergency event. The system identifies corrective actions associated with the selected emergency event. The identified corrective actions including a user action and a non-user action. Examples of non-user actions may include maintaining a rotations per minute (RPM) of a rotor of the air vehicle or maintaining an airspeed of the air vehicle to a range of nominal values. The system performs the non-user action of the identified corrective actions and notifies the user of the vehicle of the user action.

Example System Environment

Figure 1:
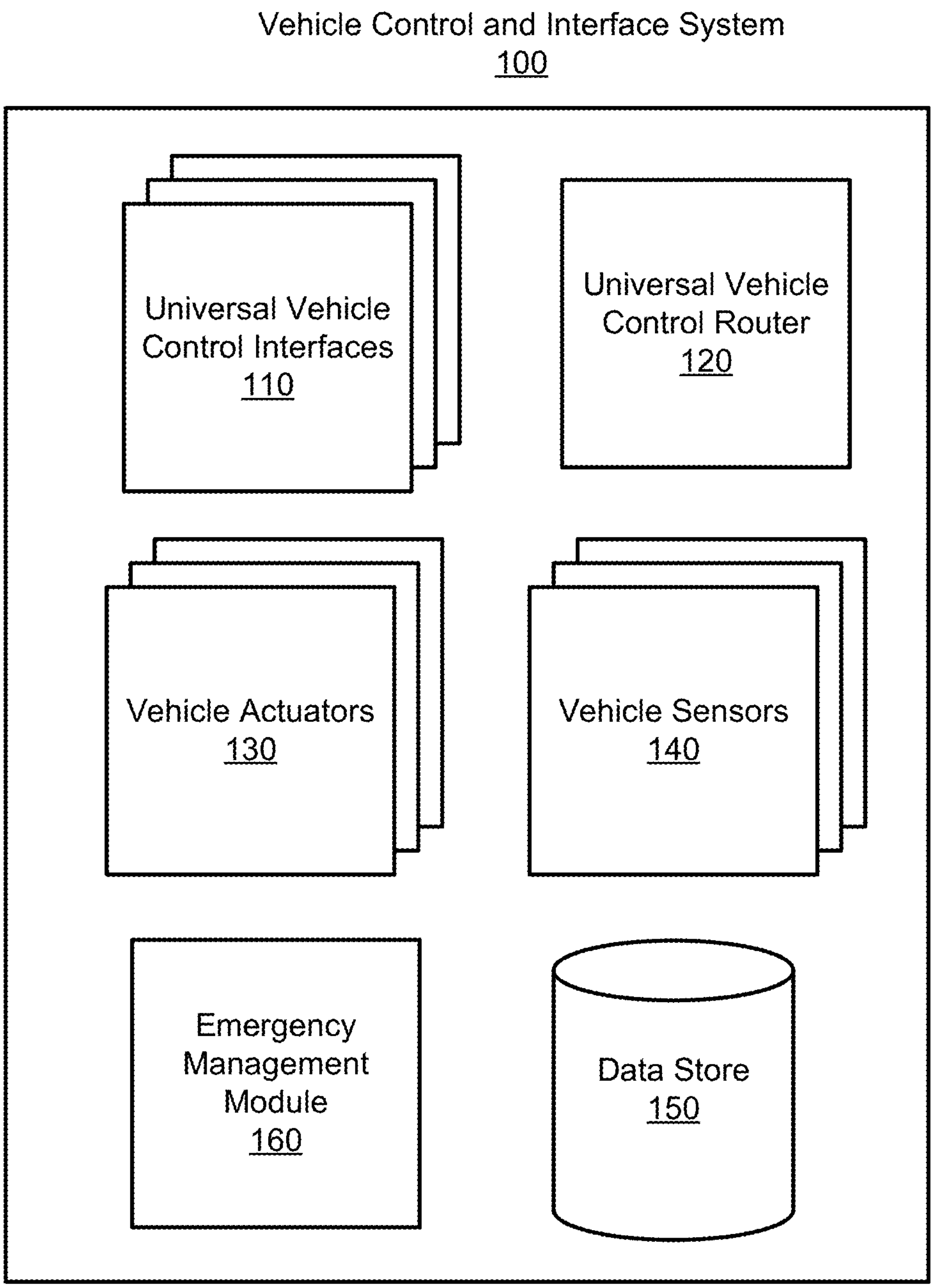
FIG. 1 illustrates one example embodiment of a vehicle control and interface system.

FIG. 1 illustrates one example embodiment of a vehicle control and interface system 100. In the example embodiment shown, vehicle control and interface system 100 includes one or more universal vehicle control interfaces 110, universal vehicle control router 120, one or more vehicle actuators 130, one or more vehicle sensors 140, and one or more data stores 150. In other embodiments, the vehicle control and interface system 100 may include different or additional elements. Furthermore, the functionality may be distributed among the elements in a different manner than described. The elements of FIG. 1 may include one or more computers that communicate via a network or other suitable communication method.

The vehicle control and interface system 100 may be integrated with various vehicles having different mechanical, hardware, or software components. For example, the vehicle control and interface system 100 may be integrated with fixed-wing aircraft (e.g., airplanes), rotorcraft (e.g., helicopters), motor vehicles (e.g., automobiles), watercraft (e.g., power boats or submarines), or any other suitable vehicle. As described in greater detail below, the vehicle control and interface system 100 is advantageously configured to receive inputs for requested operation of a particular vehicle via universal set of interfaces and the inputs to appropriate instructions for mechanical, hardware, or software components of the particular vehicle to achieve the requested operation. In doing so, the vehicle control and interface system 100 enables human operators to operate different vehicles using the same universal set of interfaces or inputs. By way of example, "universal" indicates that a feature of the vehicle control and interface system 100 may operate or be architected in a vehicle-agnostic manner. This allows for vehicle integration without necessarily having to design and configure vehicle specific customizations or reconfigurations in order to integrate the specific feature. Although universal features of the vehicle control and interface system 100 can function in a vehicle-agnostic manner, the universal features may still be configured for particular contexts. For example, the vehicle control or interface system 100 may receive or process inputs describing three-dimensional movements for vehicles that can move in three dimensions (e.g., aircraft) and conversely may receive or process inputs describing two-dimensional movements for vehicles that can move in two dimensions (e.g., automobiles). One skilled in the art will appreciate that other context-dependent configurations of universal features of the vehicle control and interface system 100 are possible.

The universal vehicle control interfaces 110 is a set of universal interfaces configured to receive a set of universal vehicle control inputs to the vehicle control and interface system 100. The universal vehicle control interfaces 110 may include one or more digital user interfaces presented to an operator of a vehicle via one or more electronic displays. Additionally, or alternatively, the universal vehicle control interfaces 110 may include one or more hardware input devices, e.g., one or more control sticks inceptors, such as side sticks, center sticks, throttles, cyclic controllers, or collective controllers. The universal vehicle control interfaces 110 receive universal vehicle control inputs requesting operation of a vehicle. In particular, the inputs received by the universal vehicle control interfaces 110 may describe a requested trajectory of the vehicle, such as to change a velocity of the vehicle in one or more dimensions or to change an orientation of the vehicle. Because the universal vehicle control inputs describe an intended trajectory of a vehicle directly rather than describing vehicle-specific precursor values for achieving the intended trajectory, such as vehicle attitude inputs (e.g., power, lift, pitch, roll yaw), the universal vehicle control inputs can be used to universally describe a trajectory of any vehicle. This is in contrast to existing systems where control inputs are received as vehicle-specific trajectory precursor values that are specific to the particular vehicle. Advantageously, any individual interface of the set of universal vehicle control interfaces 110 configured to received universal vehicle control inputs can be used to completely control a trajectory of a vehicle. This is in contrast to conventional systems, where vehicle trajectory must be controlled using two or more interfaces or inceptors that correspond to different axes of movement or vehicle actuators. For instance, conventional rotorcraft systems include different cyclic (controlling pitch and roll), collective (controlling heave), and pedal (controlling yaw) inceptors. Similarly, conventional fixed-wing aircraft systems include different stick or yoke (controlling pitch and role), power (controlling forward movement), and pedal (controlling yaw) inceptors. Example configurations of the universal vehicle control interfaces 110 are described in greater detail below.

In various embodiments, inputs received by the universal vehicle control interfaces 110 can include "steady-hold" inputs, which may be configured to hold a parameter value fixed (e.g., remain in a departed position) without a continuous operator input. Such variants can enable hands-free operation, where discontinuous or discrete inputs can result in a fixed or continuous input. In a specific example, a user of the universal vehicle control interfaces 110 can provide an input (e.g., a speed input) and subsequently remove their hands with the input remaining fixed. Alternatively, or additionally, inputs received by the universal vehicle control interfaces 110 can include one or more self-centering or automatic return inputs, which return to a default state without a continuous user input.

In some embodiments, the universal vehicle control interfaces 110 include interfaces that provide feedback information to an operator of the vehicle. For instance, the universal vehicle control interfaces 110 may provide information describing a state of a vehicle integrated with the universal vehicle control interfaces 110 (e.g., current vehicle speed, direction, orientation, location, etc.). Additionally, or alternatively, the universal vehicle control interfaces 110 may provide information to facilitate navigation or other operations of a vehicle, such as visualizations of maps, terrain, or other environmental features around the vehicle. Embodiments of interfaces providing feedback information to an operator of a vehicle are described in greater detail below with reference to FIG. 6A-C.

The universal vehicle control router 120 routes universal vehicle control inputs describing operation of a vehicle to components of the vehicle suitable for executing the operation. In particular, the universal vehicle control router 120 receives universal vehicle control inputs describing the operation of the vehicle, processes the inputs using information describing characteristics of the aircraft, and outputs a corresponding set of commands for actuators of the vehicle (e.g., the vehicle actuators 130) suitable to achieve the operation. The universal vehicle control router 120 may use various information describing characteristics of a vehicle in order to convert universal vehicle control inputs to a suitable set of commands for actuators of the vehicle. Additionally, or alternatively, the universal vehicle control router 120 may convert universal vehicle control inputs to a set of actuator commands using a set of control laws that enforce constraints (e.g., limits) on operations requested by the universal control inputs. For example, the set of control laws may include velocity limits (e.g., to prevent stalling in fixed-wing aircraft), acceleration limits, turning rate limits, engine power limits, rotor revolution per minute (RPM) limits, load power limits, allowable descent altitude limits, etc. After determining a set of actuator commands, the universal vehicle control router 120 may transmit the commands to relevant components of the vehicle for causing corresponding actuators to execute the commands. Embodiments of the universal vehicle control router 120 are described in greater detail below with reference to FIG. 3.

The universal vehicle control router 120 can decouple axes of movement for a vehicle in order to process received universal vehicle control inputs. In particular, the universal vehicle control router 120 can process a received universal vehicle control input for one axis of movement without impacting other axes of movement such that the other axes of movement remain constant. In this way, the universal vehicle control router 120 can facilitate "steady-hold" vehicle control inputs, as described above with reference to the universal vehicle control interfaces 110. This is in contrast to conventional systems, where a vehicle operator must manually coordinate all axes of movement independently for a vehicle in order to produce movement in one axis (e.g., a pure turn, a pure altitude climb, a pure forward acceleration, etc.) without affecting the other axes of movement.

In some embodiments, the universal vehicle control router 120 is configured to use one or more models corresponding to a particular vehicle to convert universal vehicle control inputs to a suitable set of commands for actuators of the vehicle. For example, a model may include a set of parameters (e.g., numerical values) that can be used as input to universal input conversion processes in order to generate actuator commands suitable for a particular vehicle. In this way, the universal vehicle control router 120 can be integrated with vehicles by substituting models used by processes of the universal vehicle control router 120, enabling efficient integration of the vehicle control and interface system 100 with different vehicles. The one or more models may be obtained by the universal vehicle control router 120 from a vehicle model database or other first-party or third-party system, e.g., via a network. In some cases, the one or more models may be static after integration with the vehicle control and interface system 100, such as if a vehicle integrated with the vehicle control and interface system 100 receives is certified for operation by a certifying authority (e.g., the United States Federal Aviation Administration). In some embodiments, parameters of the one or more models are determined by measuring data during real or simulated operation of a corresponding vehicle and fitting the measured data to the one or more models.

In some embodiments, the universal vehicle control router 120 processes universal vehicle control inputs according to a current phase of operation of the vehicle. For instance, if the vehicle is a rotorcraft, the universal vehicle control router 120 may convert a universal input describing an increase in lateral speed to one or more actuator commands differently if the rotorcraft is in a hover phase or in a forward flight phase. In particular, in processing the lateral speed increase universal input the universal vehicle control router 120 may generate actuator commands causing the rotorcraft to strafe if the rotorcraft is hovering and causing the rotorcraft to turn if the rotorcraft is in forward flight. As another example, in processing a turn speed increase universal input the universal vehicle control router 120 may generate actuator commands causing the rotorcraft to perform a pedal turn if the rotorcraft is hovering and ignore the turn speed increase universal input if the rotorcraft is in another phase of operation. As a similar example for a fixed-wing aircraft, in processing a turn speed increase universal input the universal vehicle control router 120 may generate actuator commands causing the fixed-wing aircraft to perform tight ground turn if the fixed-wing aircraft is grounded and ignore the turn speed increase universal input if the fixed-wing aircraft is in another phase of operation. One skilled in the art will appreciate that the universal vehicle control router 120 may perform other suitable processing of universal vehicle control inputs to generate actuator commands in consideration of vehicle operation phases for various vehicles.

The vehicle actuators 130 are one or more actuators configured to control components of a vehicle integrated with the universal vehicle control interfaces 110. For instance, the vehicle actuators may include actuators for controlling a power-plant of the vehicle (e.g., an engine). Furthermore, the vehicle actuators 130 may vary depending on the particular vehicle. For example, if the vehicle is a rotorcraft the vehicle actuators 130 may include actuators for controlling lateral cyclic, longitudinal cyclic, collective, and pedal controllers of the rotorcraft. As another example, if the vehicle is a fixed-wing aircraft the vehicle actuators 130 may include actuators for controlling a rudder, elevator, ailerons, and power-plant of the fixed-wing aircraft.

The vehicle sensors 140 are sensors configured to capture corresponding sensor data. In various embodiments the vehicle sensors 140 may include, for example, one or more global positioning system (GPS) receivers, inertial measurement units (IMUs), accelerometers, gyroscopes, magnometers, pressure sensors (altimeters, static tubes, pitot tubes, etc.), temperature sensors, vane sensors, range sensors (e.g., laser altimeters, radar altimeters, lidars, radars, ultrasonic range sensors, etc.), terrain elevation data, geographic data, airport or landing zone data, rotor revolutions per minute (RPM) sensors, manifold pressure sensors, or other suitable sensors. In some cases, the vehicle sensors 140 may include, for example, redundant sensor channels for some or all of the vehicle sensors 140. The vehicle control and interface system 100 may use data captured by the vehicle sensors 140 for various processes. By way of example, the universal vehicle control router 120 may use vehicle sensor data captured by the vehicle sensors 140 to determine an estimated state of the vehicle, as described in greater detail below with reference to FIG. 3.

The data store 150 is a database storing various data for the vehicle control and interface system 100. For instance, the data store 150 may store sensor data (e.g., captured by the vehicle sensors 140), vehicle models, vehicle metadata, or any other suitable data.

The emergency management module 160 (also "emergency module 160") performs various functions associated with emergency events. For example, the emergency module 160 can accurately interpret vehicle issues, identify emergency events, take (e.g., immediate) corrective actions, and provide appropriate augmentation in a manner that assists a user (e.g., pilot) to remedy, solve or overcome emergency events. The emergency module 160 may interact with any of the other components of the vehicle control and interface system 100 (e.g., the control router 120). The emergency module 160 is described in more detail with respect to FIGS. 7-10.

Figure 2:
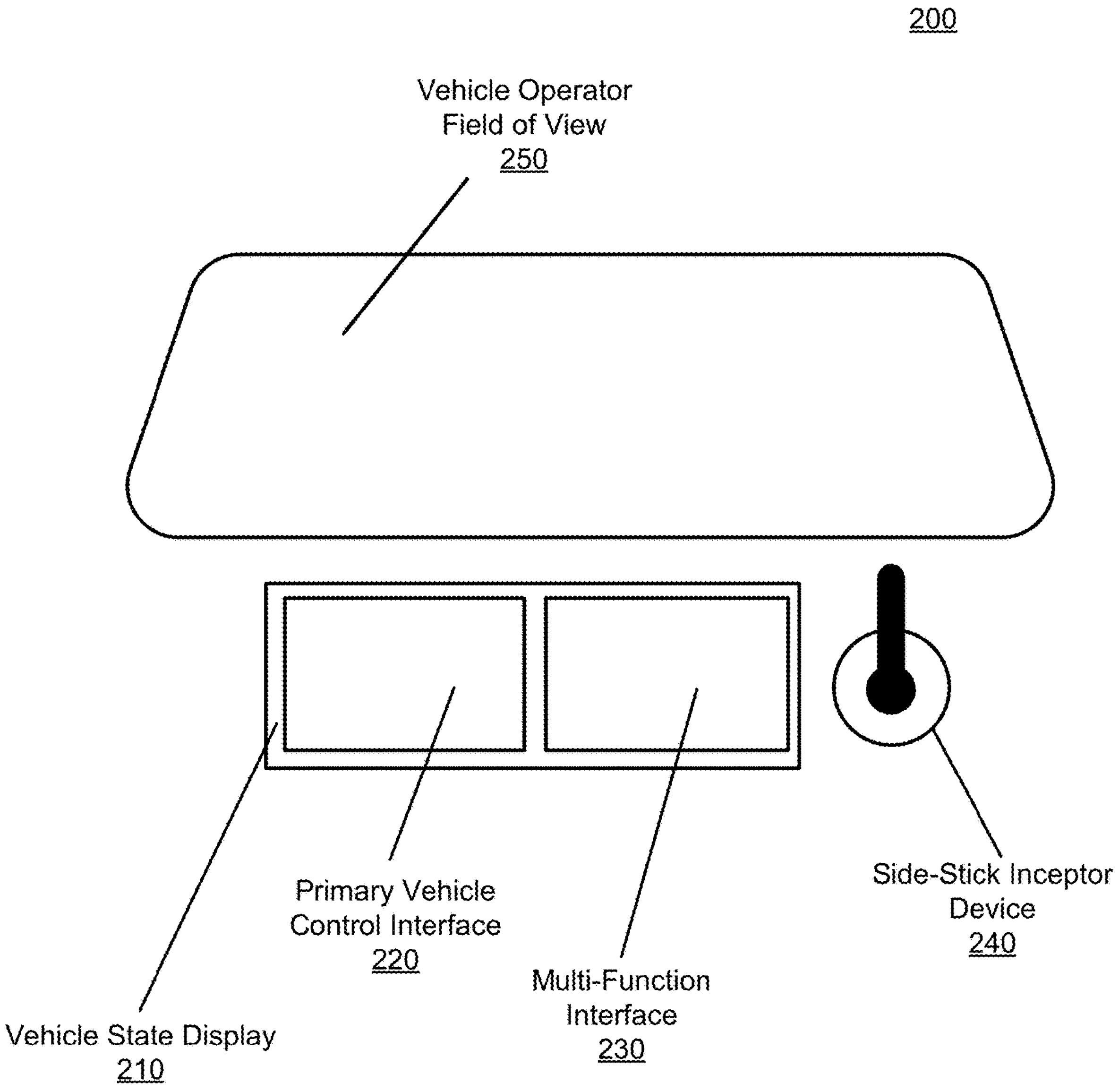
FIG. 2 illustrates one example embodiment of a configuration for a set of universal vehicle control interfaces in a vehicle.

FIG. 2 illustrates one example embodiment of a configuration 200 for a set of universal vehicle control interfaces in a vehicle. The vehicle control interfaces in the configuration 200 may be embodiments of the universal vehicle control interfaces 110, as described above with reference to FIG. 1. In the embodiment shown, the configuration 200 includes a vehicle state display 210, a side-stick inceptor device 240, and a vehicle operator field of view 250. In other embodiments, the configuration 200 may include different or additional elements. Furthermore, the functionality may be distributed among the elements in a different manner than described.

The vehicle state display 210 is one or more electronic displays (e.g., liquid-crystal displays (LCDs) configured to display or receive information describing a state of the vehicle including the configuration 200. In particular, the vehicle state display 210 may display various interfaces including feedback information for an operator of the vehicle. In this case, the vehicle state display 210 may provide feedback information to the operator in the form of virtual maps, 3D terrain visualizations (e.g., wireframe, rendering, environment skin, etc.), traffic, weather, engine status, communication data (e.g., air traffic control (ATC) communication), guidance information (e.g., guidance parameters, trajectory), and any other pertinent information. Additionally, or alternatively, the vehicle state display 210 may display various interfaces for configuring or executing automated vehicle control processes, such as automated aircraft landing or takeoff or navigation to a target location. The vehicle state display 210 may receive user inputs via various mechanisms, such as gesture inputs (as described above with reference to the gesture interface 220), audio inputs, or any other suitable input mechanism. Embodiments of the vehicle state display 230 are described in greater detail below with reference to FIGS. 3 and 6A-C.

As depicted in FIG. 2 the vehicle state display 210 includes a primary vehicle control interface 220 and a multi-function interface 230. The primary vehicle control interface 220 is configured to facilitate short-term of the vehicle including the configuration 200. In particular, the primary vehicle control interface 220 includes information immediately relevant to control of the vehicle, such as current universal control input values or a current state of the vehicle. As an example, the primary vehicle control interface 220 may include a virtual object representing the vehicle in 3D or 2D space. In this case, the primary vehicle control interface 220 may adjust the display of the virtual object responsive to operations performed by the vehicle in order to provide an operator of the vehicle with visual feedback. The primary vehicle control interface 220 may additionally, or alternatively, receive universal vehicle control inputs via gesture inputs. Example embodiments of the primary vehicle control interface 220 are described in greater detail below with reference to FIGS. 6A-C.

The multi-function interface 230 is configured to facilitate long-term control of the vehicle including the configuration 200. In particular, the primary vehicle control interface 220 may include information describing a mission for the vehicle (e.g., navigation to a target destination) or information describing the vehicle systems. Information describing the mission may include routing information, mapping information, or other suitable information. Information describing the vehicle systems may include engine health status, engine power utilization, fuel, lights, vehicle environment, or other suitable information. In some embodiments, the multi-function interface 230 or other interfaces enable mission planning for operation of a vehicle. For example, the multi-function interface 230 may enable configuring missions for navigating a vehicle from a start location to a target location. In some cases, the multi-function interface 230 or another interface provides access to a marketplace of applications and services. The multi-function interface 230 may also include a map, a radio tuner, or a variety of other controls and system functions for the vehicle. An example embodiment of the multi-function interface 230 is described in greater detail below with reference to FIG. 6A-D.

In some embodiments, the vehicle state display 210 includes information describing a current state of the vehicle relative to one or more control limits of the vehicle (e.g., on the primary vehicle control interface 220 or the multi-function interface 230). For example, the information may describe power limits of the vehicle or include information indicating how much control authority a use has across each axis of movement for the vehicle (e.g., available speed, turning ability, climb or descent ability for an aircraft, etc.). In the same or different example embodiment, the vehicle state display 210 may display different information depending on a level of experience of a human operator of the vehicle. For instance, if the vehicle is an aircraft and the human operator is new to flying, the vehicle state display may include information indicating a difficulty rating for available flight paths (e.g., beginner, intermediate, or expert). The particular experience level determined for an operator may be based upon prior data collected and analyzed about the human operator corresponding to their prior experiences in flying with flight paths having similar expected parameters. Additionally, or alternatively, flight path difficulty ratings for available flight paths provided to the human operator may be determined based on various information, for example, expected traffic, terrain fluctuations, airspace traffic and traffic type, how many airspaces and air traffic controllers along the way, or various other factors or variables that are projected for a particular flight path. Moreover, the data collected from execution of this flight path can be fed back into the database and applied to a machine learning model to generate additional and/or refined ratings data for the operator for subsequent application to other flight paths. Vehicle operations may further be filtered according to which one is the fastest, the most fuel efficient, or the most scenic, etc.

The one or more vehicle state displays 210 may include one or more electronic displays (e.g., liquid-crystal displays (LCDs), organic light emitting diodes (OLED), plasma). For example, the vehicle state display 210 may include a first electronic display for the primary vehicle control interface 220 and a second electronic display for the multi-function interface 230. In cases where the vehicle state display 210 include multiple electronic displays, the vehicle state display 210 may be configured to adjust interfaces displayed using the multiple electronic displays, e.g., in response to failure of one of the electronic displays. For example, if an electronic display rendering the primary vehicle control interface 240 fails, the vehicle state display 210 may display some or all of the primary vehicle control interface 240 on another electronic display.

The one or more electronic displays of the vehicle state display 210 may be touch sensitive displays is configured to receive touch inputs from an operator of the vehicle including the configuration 200, such as a multi-touch display. For instance, the primary vehicle control interface 220 may be a gesture interface configured to receive universal vehicle control inputs for controlling the vehicle including the configuration 200 via touch gesture inputs. In some cases, the one or more electronic displays may receive inputs via other type of gestures, such as gestures received via an optical mouse, roller wheel, three-dimensional (3D) mouse, motion tracking device (e.g., optical tracking), or any other suitable device for receiving gesture inputs. Embodiments of a gesture interface are described in greater detail below with reference to FIGS. 3, 4, and 5.

Touch gesture inputs received by one or more electronic displays of the vehicle state display 210 may include single finger gestures (e.g., executing a predetermined pattern, swipe, slide, etc.), multi-finger gestures (e.g., 2, 3, 4, 5 fingers, but also palm, multi-hand, including/excluding thumb, etc.; same or different motion as single finger gestures), pattern gestures (e.g., circle, twist, convergence, divergence, multi-finger bifurcating swipe, etc.), or any other suitable gesture inputs. Gesture inputs can be limited asynchronous inputs (e.g., single input at a time) or can allow for multiple concurrent or synchronous inputs. In variants, gesture input axes can be fully decoupled or independent. In a specific example, requesting a speed change holds other universal vehicle control input parameters fixed—where vehicle control can be automatically adjusted in order to implement the speed change while holding heading and vertical rate fixed. Alternatively, gesture axes can include one or more mutual dependencies with other control axes. Unlike conventional vehicle control systems, such as aircraft control systems, the gesture input configuration as disclosed provides for more intuitive user experiences with respect to an interface to control vehicle movement.

In some embodiments, the vehicle state display 220 or other interfaces are configured to adjust in response to vehicle operation events, such as emergency conditions. For instance, in response to determining the vehicle is in an emergency condition, the vehicle control and interface system 100 may adjust the vehicle state display 210 to include essential information or remove irrelevant information. As an example, if the vehicle is an aircraft and the vehicle control and interface system 100 detects an engine failure for the aircraft, the vehicle control and interface system 100 may display essential information on the vehicle state display 210 including 1) a direction of the wind, 2) an available glide range for the aircraft (e.g., a distance that the aircraft can glide given current conditions), or 3) available emergency landing spots within the glide range. The vehicle control and interface system 100 may identify emergency landing locations using various processes, such as by accessing a database of landing spots (e.g., included in the data store 150 or a remote database) or ranking landing spots according to their suitability for an emergency landing.

The side-stick inceptor device 240 may be a side-stick inceptor configured to receive universal vehicle control inputs. In particular, the side-stick inceptor device 240 may be configured to receive the same or similar universal vehicle control inputs as a gesture interface of the vehicle state display 210 is configured to receive. In this case, the gesture interface and the side-stick inceptor device 240 may provide redundant or semi-redundant interfaces to a human operator for providing universal vehicle control inputs. The side-stick inceptor device 240 may be active or passive. Additionally, the side-stick inceptor device 240 and may include force feedback mechanisms along any suitable axis. For instance, the side-stick inceptor device 240 may be a 3-axis inceptor, 4-axis inceptor (e.g., with a thumb wheel), or any other suitable inceptor. Processing inputs received via the side-stick inceptor device 240 is described in greater detail below with reference to FIGS. 3 and 5.

The components of the configuration 200 may be integrated with the vehicle including the configuration 200 using various mechanical or electrical components. These components may enable adjustment of one or more interfaces of the configuration 200 for operation by a human operator of the vehicle. For example, these components may enable rotation or translation of the vehicle state display 230 toward or away from a position of the human operator (e.g., a seat where the human operator sits). Such adjustment may be intended, for example, to prevent the interfaces of the configuration 200 from obscuring a line of sight of the human operator to the vehicle operator field of view 250.

The vehicle operator field of view 250 is a first-person field of view of the human operator of the vehicle including the configuration 200. For example, the vehicle operator field of view 250 may be a windshield of the vehicle or other suitable device for enabling a first-person view for a human operator.

The configuration 200 additionally or alternately include other auxiliary feedback mechanisms, which can be auditory (e.g., alarms, buzzers, etc.), haptic (e.g., shakers, haptic alert mechanisms, etc.), visual (e.g., lights, display cues, etc.), or any other suitable feedback components. Furthermore, displays of the configuration 200 (e.g., the vehicle state display 210) can simultaneously or asynchronously function as one or more of different types of interfaces, such as an interface for receiving vehicle control inputs, an interface for displaying navigation information, an interface for providing alerts or notifications to an operator of the vehicle, or any other suitable vehicle instrumentation. Furthermore, portions of the information can be shared between multiple displays or configurable between multiple displays.

Example Vehicle Control Router

Figure 3:
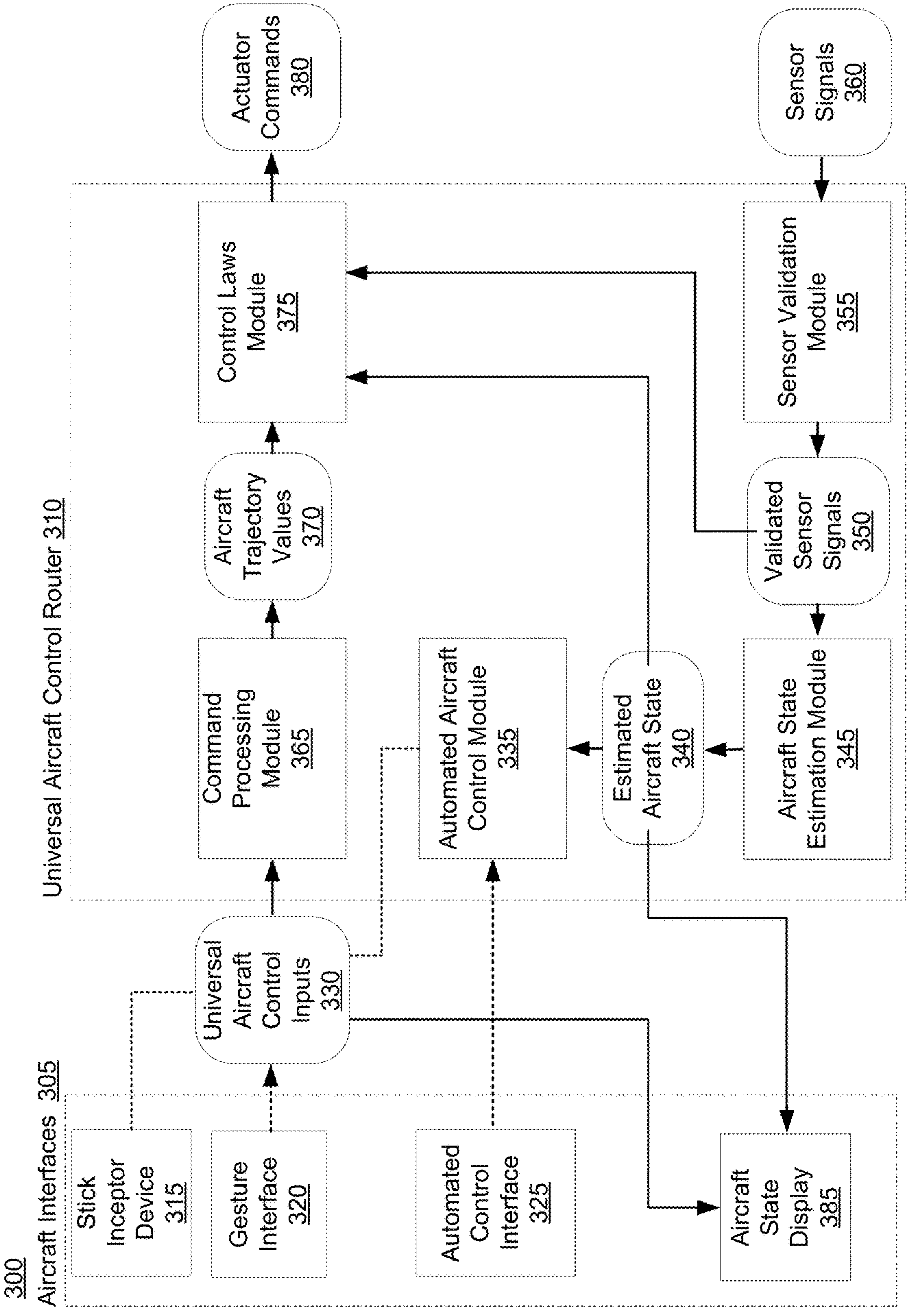
FIG. 3 illustrates one example embodiment of a process flow for a universal aircraft control router to convert a set of universal aircraft control inputs to corresponding actuator commands for a particular aircraft.

FIG. 3 illustrates one embodiment of a process flow 300 for a universal aircraft control router 310 to convert a set of universal aircraft control inputs 330 to corresponding actuator commands 380 for a particular aircraft. The universal aircraft control router 310 may be an embodiment of the universal vehicle control router 120. Although the embodiment depicted in FIG. 3 is particularly directed to operating an aircraft (e.g., a rotorcraft or fixed-wing aircraft), one skilled in the art will appreciate that similar processes can be applied to other vehicles, such as motor vehicles or watercraft.

In the embodiment shown in FIG. 3, the set of universal aircraft control inputs 330 originate from one or more of aircraft interfaces 305. The aircraft interfaces 305 may be embodiments of the universal vehicle control interfaces 110. In particular, the aircraft interfaces 305 include a stick inceptor device 315 (e.g., the side-stick inceptor device 240), a gesture interface (e.g., a gesture interface of the vehicle state display 210), and an automated control interface 325 (e.g., an automated vehicle control interface of the vehicle state display 210). As indicated by the dashed lines, at a given time the universal aircraft control inputs 330 may include input received from some or all of the aircraft interfaces 305.

Inputs received from the stick inceptor device 315 or the gesture interface 320 are routed directly to the command processing module 365 as universal aircraft control inputs 330. Conversely, inputs received from the automated control interface 325 are routed to an automated aircraft control module 335 of the universal aircraft control router 310. Inputs received by the automated aircraft module may include information for selecting or configuring automated control processes. The automated control processes may include automated aircraft control macros (e.g., operation routines), such as automatically adjusting the aircraft to a requested aircraft state (e.g., a requested forward velocity, a requested lateral velocity, a requested altitude, a requested heading, a requested landing, a requested takeoff, etc.). Additionally, or alternatively, the automated control processes may include automated mission or navigation control, such as navigating an aircraft from an input starting location to an input target location in the air or ground. In these or other cases, the automated aircraft control module 335 generates a set of universal aircraft control inputs suitable for executing the requested automated control processes. The automated aircraft control module 335 may use the estimated aircraft state 340 to generate the set of universal aircraft control inputs, as described below with reference to the aircraft state estimation module 345. Additionally, or alternatively, the automated aircraft control module 335 may generate the set of universal aircraft control inputs over a period of time, for example during execution of a mission to navigate to a target location. The automated aircraft control module 335 further provides generated universal aircraft control inputs for inclusion in the set of universal aircraft control inputs 330.

The aircraft state estimation module 345 determines the estimated aircraft state 340 of the aircraft including the universal aircraft control router 310 using the validated sensor signals 350. The estimated aircraft state 340 may include various information describing a current state of the aircraft, such as an estimated 3D position of the vehicle with respect to the center of the Earth, estimated 3D velocities of the aircraft with respect to the ground or with respect to a moving air mass, an estimated 3D orientation of the aircraft, estimated 3D angular rates of change of the aircraft, an estimated altitude of the aircraft, or any other suitable information describing a current state of the aircraft. The aircraft state estimation module 345 determines the estimated state of the aircraft 340 by combining validated sensor signals 350 captured by different types of sensors of the aircraft, such as the vehicle sensors 140 described above with reference to FIG. 1. In some cases, sensor signals may be captured by different types of sensors of the aircraft at different frequencies or may not be available at a particular time. In such cases, the aircraft state estimation module 345 may adjust the process used to determine the estimated aircraft state 340 depending on which sensor signals are available in the validated sensor signals 350 at a particular time. For example, the aircraft state estimation module 345 may use a global positioning system (GPS) signal to estimate an altitude of the aircraft whenever it is available and may instead use a pressure signal received from a pressure altimeter to estimate a barometric altitude of the aircraft if the GPS signal is unavailable. As another example, if validated sensor signals 350 are not available for a particular sensor channel the aircraft state estimation module 350 may estimate validated sensor signals for the particular sensor channel. In particular, the aircraft state estimation module 350 may estimate validated sensor signals using a model including parameters for the aircraft. In some cases, the parameters of a model for the aircraft may be dynamic, e.g., adjusting with respect to a state of the aircraft. Such dynamic adjustment of model parameters may facilitate more accurate estimation of a future state of the aircraft in the near future or for reduced-lag filtering of the sensor signals.

In some embodiments, the aircraft state estimation module 345 precisely estimates an altitude of the aircraft above a surface of the Earth (e.g., an "altitude above the ground") by combining multiple altitude sensor signals included in the validated sensor signals 350. Altitude sensor signals may include GPS signals, pressure sensor signals, range sensor signals, terrain elevation data, or other suitable information. The aircraft state estimation module 345 may estimate an altitude of the aircraft above an ellipsoid representing the Earth using a GPS signal if the GPS signal is available in the validated sensor signals 350. In this case, the aircraft state estimation module 345 may estimate the altitude above the ground by combining the altitude above the ellipsoid with one or more range sensor signals (e.g., as described above with reference to the vehicle sensors 140) or terrain elevation data. Additionally, or alternatively, the aircraft state estimation module 345 may determine an offset between the altitude above the ellipsoid and a barometric altitude determined, e.g., using sensor signals captured by a pressure altimeter. In this case, aircraft state estimation module 345 may apply the offset to a currently estimated barometric altitude if a GPS signal is unavailable in order to determine a substitute altitude estimate for the altitude above the ellipsoid. In this way, the aircraft state estimation module 345 may still provide precise altitude estimates during GPS signal dropouts the and a barometric altitude using a pressure value received from a pressure altimeter.

Among other advantages, by precisely estimating the altitude above the ground through combining multiple altitude sensor signals, the aircraft state estimation module 345 can provide altitude estimates usable for determining if the aircraft has landed, taken off, or is hovering. Additionally, the aircraft state estimation module 345 can provide altitude estimates indicating precise characteristics of the ground below the aircraft, e.g., if the ground is tilted or level in order to assess if a landing is safe. This is in contrast to conventional systems, which require specialized equipment for determining specific aircraft events requiring precise altitude determinations (e.g., takeoffs or landing) due to imprecise altitude estimates. As an example, the universal aircraft control router 310 can use the precise altitude estimates to perform automatic landing operations at locations that are not equipped with instrument landing systems for poor or zero-visibility conditions (e.g., category II or III instrument landing systems). As another example, universal aircraft control router 310 can use the precise altitude estimates to automatically maintain a constant altitude above ground for a rotorcraft (e.g., during hover-taxi) despite changing ground elevation below the rotorcraft. As still another example, the universal aircraft control router 310 can use the precise altitude estimates to automatically take evasive action to avoid collisions (e.g., ground collisions).

In some embodiments, the aircraft state estimation module 345 estimates a ground plane below the aircraft. In particular, the aircraft state estimation module 345 may estimate the ground plane combing validated sensor signals from multiple range sensors. Additionally, or alternatively, the aircraft state estimation module 345 may estimate of a wind vector by combining a ground velocity, airspeed, or sideslip angle measurements for the aircraft.

The sensor validation module 355 validates sensor signals 360 captured by sensors of the aircraft including the universal aircraft control router 310. For example, the sensor signals 360 may be captured by embodiments of the vehicle sensors 140 described above with reference to FIG. 1. The sensor validation module 355 may use various techniques to validate the sensor signals 360. In particular, the sensor validation module 355 may set flags for each aircraft sensor indicating a state of the sensor that are updated on a periodic or continual basis (e.g., every time step). For instance, the flags may indicate a quality of communication from a sensor (e.g., hardware heartbeat or handshake, a transportation checksum, etc.) whether captured sensor signals are sensical or non-sensical (e.g., within realistic value ranges), or whether captured sensor values are valid or invalid in view of a current state of the aircraft (e.g., as determined using the estimated aircraft state 340). In such cases the sensor validation module 355 may not validate sensor signals form the sensor signals 360 that correspond to aircraft sensors having certain flags set (e.g., nonsensical or invalid sensor signals). Additionally, or alternatively, the sensor validation module 355 may receive sensor signals from different aircraft sensors asynchronously. For example, different aircraft sensors may capture sensor signals at different rates or may experience transient dropouts or spurious signal capture. In order to account for asynchronous reception of sensor signals, the sensor validation module 355 may apply one or more filters to the sensor signals 360 that synchronize the sensor signals for inclusion in the validated sensor signals 350.

In some embodiments, the aircraft sensors include multiple sensors of the same type capturing sensor signals of the same type, referred to herein as redundant sensor channels and redundant sensor signals, respectively. In such cases the sensor validation module may compare redundant sensor signals in order to determine a cross-channel coordinated sensor value. For instance, the sensor validation module 355 may perform a statistical analysis or voting process on redundant sensor signals (e.g., averaging the redundant sensor signals) to determine the cross-channel coordinated sensor value. The sensor validation module 355 may include cross-channel coordinated sensor values in the validated sensor signals 350.

The command processing module 365 generates the aircraft trajectory values 370 using the universal aircraft control inputs 330. The aircraft trajectory values 370 describe universal rates of change of the aircraft along movement axes of the aircraft in one or more dimensions. For instance, the aircraft trajectory values 370 may include 3D linear velocities for each axis of the aircraft (e.g., x-axis or forward velocity, y-axis or lateral velocity, and z-axis or vertical velocity) and an angular velocity around a pivot axis of the vehicle (e.g., degrees per second), such as a yaw around a yaw axis.

In some embodiments the command processing module 365 performs one or more smoothing operations to determine a set of smoothed aircraft trajectory values that gradually achieve a requested aircraft trajectory described by the universal aircraft control inputs 330. For instance, the universal aircraft control inputs 330 may include a forward speed input that requests a significant increase in speed from a current speed (e.g., from 10 knots per second (KTS) to 60 KTS). In this case, the command processing module 365 may perform a smoothing operation to convert the forward speed input to a set of smoothed velocity values corresponding to a gradual increase in forward speed from a current aircraft forward speed to the requested forward speed. The command processing module 365 may include the set of smoothed aircraft trajectory values in the aircraft trajectory values. In some cases, the command processing module 365 may apply different smoothing operations to universal aircraft control inputs originating from different interfaces of the aircraft interfaces 305. For instance, the command processing module 365 may apply more gradual smoothing operations to universal aircraft control inputs received from the gesture interface 320 and less gradual smoothing operations to the stick inceptor device 315. Additionally, or alternatively, the command processing module 365 may apply smoothing operations or other operations to universal aircraft control inputs received from the stick inceptor device 315 in order to generate corresponding aircraft trajectory values that simulate manual operation of the aircraft.

In some embodiments, the command processing module 365 processes individual aircraft control inputs in the universal aircraft control inputs 330 according to an authority level of the individual aircraft control inputs. In particular, the authority levels indicate a processing priority of the individual aircraft control inputs. An authority level of an aircraft control input may correspond to an interface of the aircraft interfaces 305 that the aircraft control input originated from, may correspond to a type of operation the aircraft control input describes, or some combination thereof. In one embodiment, aircraft control inputs received from the stick inceptor device 315 have an authority level with first priority, aircraft control inputs received from the gesture interface 320 have an authority level with second priority, aircraft control inputs received from the automated aircraft control module 335 for executing automated aircraft control macros have an authority level with a third priority, and aircraft control inputs received from the automated aircraft control module 335 for executing automated control missions have an authority level with a fourth priority. Other embodiments may have different authority levels for different aircraft control inputs or may include more, fewer, or different authority levels. As an example, an operator of the aircraft may provide an aircraft control input via the stick inceptor device 315 during execution of an automated mission by the automated aircraft control module 335. In this case, the command processing module 365 interrupts processing of aircraft control inputs corresponding to automated mission in order to process the aircraft control input received from the stick inceptor device 315. In this way, the command processing module 365 may ensure that the operator of the aircraft can take control of the aircraft at any time via a suitable interface.

The control laws module 375 generates the actuator commands (or signals) 380 using the aircraft trajectory values 370. The control laws module 375 includes an outer processing loop and an inner processing loop. The outer processing loop applies a set of control laws to the received aircraft trajectory values 370 to convert the aircraft trajectory values 370 to corresponding allowable aircraft trajectory values. Conversely, the inner processing loop converts the allowable aircraft trajectory values to the actuator commands 380 configured to operate the aircraft to adjust a current trajectory of the aircraft to an allowable trajectory defined by the allowable aircraft trajectory values. Both the outer processing loop and the inner processing loop are configured to operate independently of the particular aircraft including the universal aircraft control router 310. In order to operate independently in this manner, the inner and outer processing loops may use a model including parameters describing characteristics of the aircraft that can be used as input to processes or steps of the outer and inner processing loops. In some embodiments, the model used by the control laws module 375 is a different than the model used by the aircraft state estimation module 345, as described above. For instance, the models used by the control laws module 375 and the aircraft state estimation module 345 may respectively include parameters relevant to determining the actuator commands 380 and relevant to determining the estimated aircraft state 340. The control laws module 375 may use the actuator commands 380 to directly control corresponding actuators, or may provide the actuator commands 380 to one or more other components of the aircraft to be used to operate the corresponding actuators.

The outer processing loop may apply the limit laws in order impose various protections or limits on operation of the aircraft, such as aircraft envelope protections, movement range limits, structural protections, aerodynamic protections, impose regulations (e.g., noise, restricted airspace, etc.), or other suitable protections or limits. Moreover, the limit laws may be dynamic, such as varying depending on an operational state of the aircraft, or static, such as predetermined for a particular type of aircraft or type of aircraft control input. As an example, if the aircraft is a rotorcraft the set of control laws applied by the outer processing loop may include maximum and minimum rotor RPMs, engine power limits, aerodynamic limits such as ring vortex, loss of tail-rotor authority, hover lift forces at altitude, boom strike, maximum bank angle, or side-slip limits. As another example, if the aircraft is a fixed-wing aircraft the set of control laws applied by the outer processing loop may include stall speed protection, bank angle limits, side-slip limits, g-loads, flaps or landing gear max extension speeds, or velocity never exceeds (VNEs). Additionally, or alternatively, the outer processing loop uses the estimated aircraft state 340 to convert the aircraft trajectory values 370 to corresponding allowable aircraft trajectory values. For instance, the outer processing loop may compare a requested aircraft state described by the aircraft trajectory values 370 to the estimated aircraft state 340 in order to determine allowable aircraft trajectory values, e.g., to ensure stabilization of the aircraft.

In some embodiments, the inner processing loop converts the allowable aircraft trajectory values in an initial frame of reference to a set of body trajectory values relative to a body frame of reference for the aircraft. In particular, the set of body trajectory values precisely define movement of the aircraft intended by the allowable aircraft trajectory values. The initial frame of reference may be various suitable frames of reference, such as an inertial frame of reference, a frame of reference including rotations around one or more axes of the inertial frame, or some combination thereof. For instance, if the allowable aircraft trajectory values include a velocity for an x-axis, y-axis, z-axis and a heading rate change, the initial frame of reference may be an inertial frame with a rotation (e.g., yaw) around the z-axis. The body frame includes eight coordinates collectively representing 3D velocities and yaw, pitch, and roll angles of the aircraft.

In the same or different embodiments, the inner processing loop determines a difference between the estimated aircraft state 340 and an intended aircraft state corresponding to the allowable aircraft trajectory values, the difference referred to herein as a "command delta." For example, the inner processing loop may determine the intended aircraft state using the body trajectory values of the aircraft, as described above. The inner processing loop uses the command delta to determine actuator commands 380 configured to operate actuators of the aircraft to adjust the state of the aircraft to the intended aircraft state. In some cases, the inner processing loop applies a gain schedule to the command delta to determine the actuator commands 380. For example, the inner processing loop may operate as a linear-quadratic regulator (LQR). Applying the gain schedule may include applying one or more gain functions to the command delta. The control laws module 375 may determine the gain schedule based on various factors, such as a trim airspeed value corresponding to the linearization of nonlinear aircraft dynamics for the aircraft. In the same or different embodiments, the inner processing loop uses a multiple input and multiple output (MIMO) protocol to determine or transmit the actuator commands 380.

In some embodiments where the aircraft is a rotorcraft, the outer processing loop is configured to facilitate execution of an automatic autorotation process for the rotorcraft. In particular, the automatic autorotation process facilitates autorotation by the rotorcraft during entry, glide, flare, and touch down phases. Additionally, or alternatively, the outer processing loop may be configured to facilitate autorotation by the aircraft in response to one or more emergency conditions (e.g., determined based on the estimated aircraft state 340). Execution of the automatic autorotation process by the outer processing loop offloads operation autorotation rotorcraft maneuvers from a human operator of the rotorcraft, thus simplifying user operation and improving the safety. Furthermore, in embodiments where the aircraft is a fixed-wing aircraft, the outer processing loop may facilitate an automatic landing procedure. In particular, the outer processing loop may facilitate the automatic landing procedure even during emergency conditions, e.g., if an engine of the aircraft has failed. The aircraft state display 385 includes one or more interfaces displaying information describing the estimated aircraft state 340 received from the universal aircraft control router 310. For instance, the aircraft state display may be an embodiment of the aircraft state display 210 described above with reference to FIG. 2. The aircraft state display 385 may display information describing the estimated aircraft state 340 for various reasons, such as to provide feedback to an operator of the aircraft responsive to the universal aircraft control inputs 330 or to facilitate navigation of the aircraft. Example aircraft state interfaces that may be displayed by the aircraft state display 385 are described in greater detail below with reference to FIGS. 6A-D.

Example Vehicle Control Interfaces

FIGS. 4, 5, and 6A-D illustrate embodiments of universal aircraft control inputs and interfaces. For example, the interfaces illustrated by in FIGS. 6A-D may be example embodiments of the universal vehicle control interfaces 110, e.g., which may be rendered and interacted with through on a touch sensitive display. Although the embodiments depicted in FIGS. 4, 5, and 6A-D are particularly directed to operating an aircraft (e.g., a rotorcraft or fixed-wing aircraft), one skilled in the art will appreciate that similar interfaces can be applied to other vehicles, such as motor vehicles or watercraft.

Figure 4:
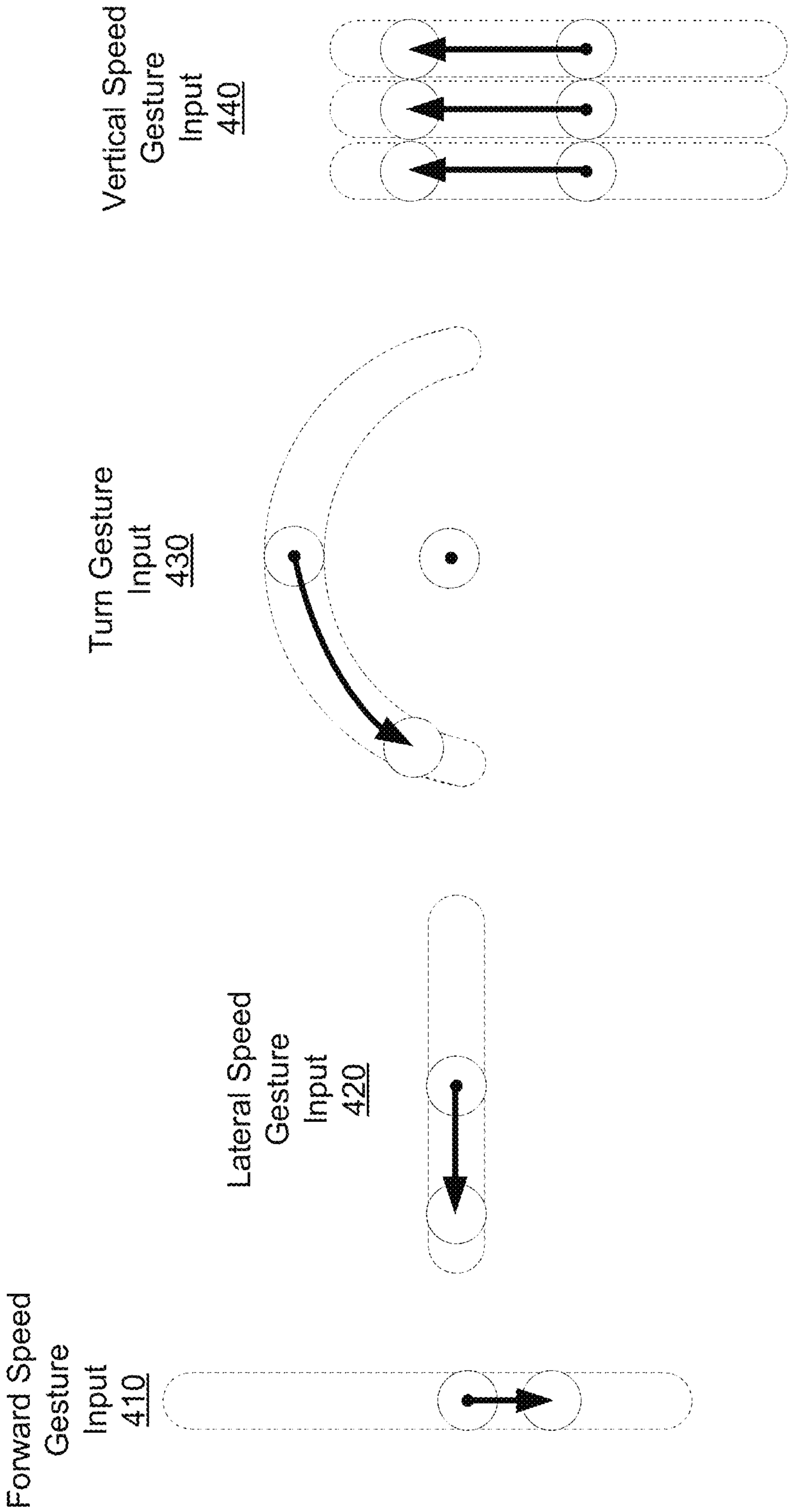
FIG. 4 illustrates one example embodiment of a gesture display configured to provide universal aircraft control inputs for controlling an aircraft.

FIG. 4 illustrates one embodiment of a set of gesture inputs 400 to a gesture interface configured to provide universal aircraft control inputs on a touch sensitive display for controlling an aircraft. As an example, the set of gesture inputs 400 may be received via one of the aircraft interfaces 305. For example, the gesture inputs 400 may be received by the gesture interface 320. In the embodiment shown, the set of gesture inputs 400 include a forward speed gesture input 410, a lateral speed gesture input 420, a turn gesture input 430, and a vertical speed gesture input 440. In other embodiments, the set of gesture inputs 400 may include fewer, more, or different control inputs.

As depicted in FIG. 4, the gesture inputs 410, 420, 430, and 440 illustrate example finger movements from an initial touch position, indicated by circles with black dots, to a final touch position, indicated by circles pointed to by arrows extending from the initial touch positions. The arrows illustrate an example direction of movement for the gesture inputs 410, 420, 430, and 440. As depicted in FIG. 4, the forward speed gesture input 410 illustrates a downward single finger swipe gesture indicating a decrease in aircraft forward speed. The lateral speed gesture input 420 illustrates a leftward single finger swipe gesture indicating a leftward increase in aircraft lateral speed. The turn gesture input 430 illustrates a counter-clockwise double finger swipe gesture indicating a counter-clockwise change in aircraft turn rate, where, e.g., an index finger of a user may be placed at the top initial touch position and the thumb of the user may be placed at the bottom initial touch position. Finally, the vertical speed gesture input 440 illustrates a three-finger upward swipe to indicate an increase in aircraft altitude.

The gesture inputs 410, 420, 430, and 440 further include possible movement regions (indicated by the dashed lines) that indicate a range of possible movements for each of the gesture inputs 410, 420, 430, and 440. For instance, as depicted in FIG. 4 the forward speed gesture input may be a leftward swipe to decrease aircraft forward speed or an upward swipe to increase aircraft forward speed.

Figure 5:
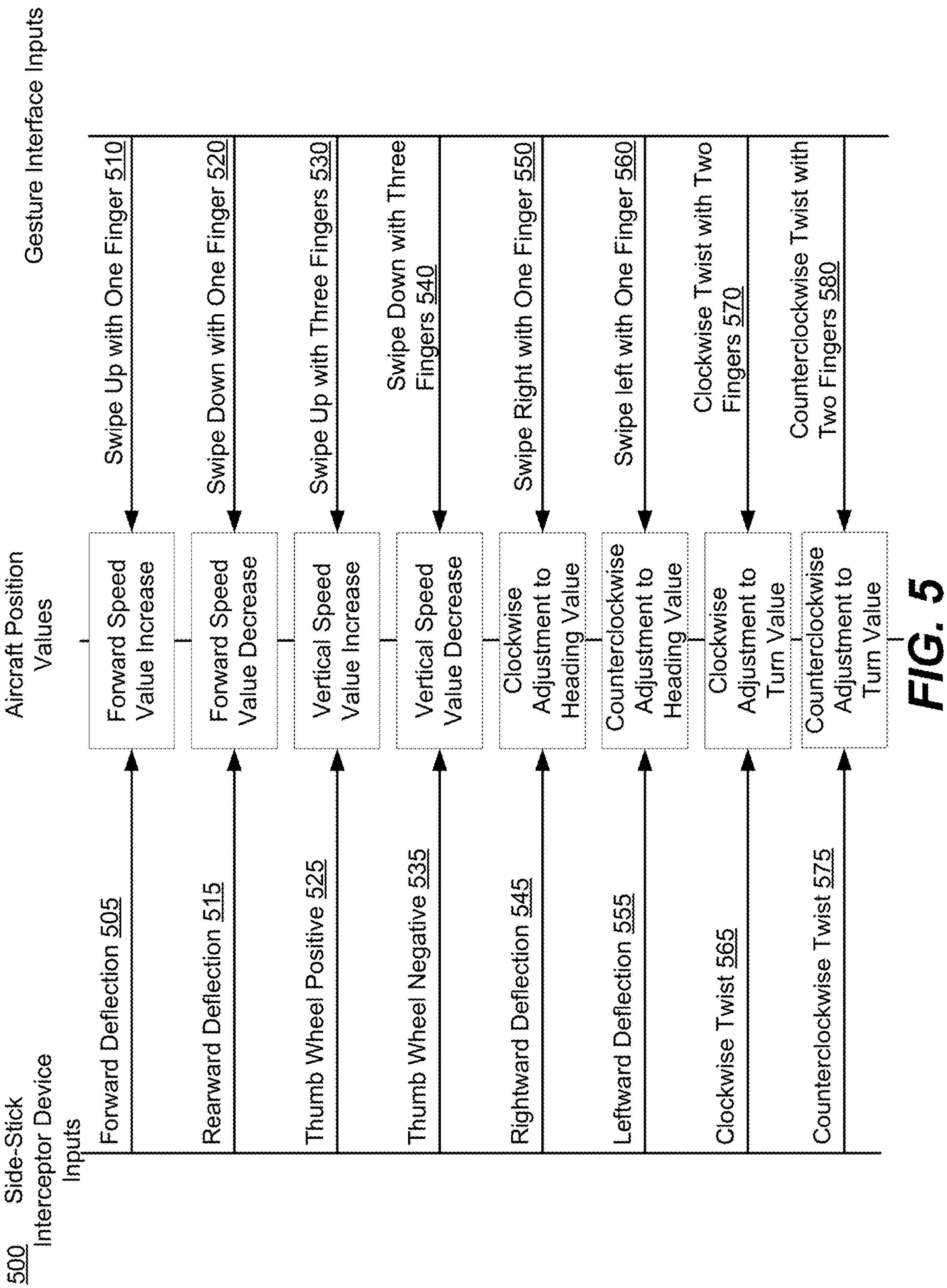
FIG. 5. illustrates one example embodiment of a mapping between universal aircraft control inputs and universal aircraft trajectory values.

FIG. 5 illustrates one embodiment of a mapping 500 between universal aircraft control inputs and universal aircraft trajectory values. For example, the universal aircraft control inputs may be included in the universal aircraft control inputs 330. Similarly, the universal aircraft trajectory values may be determined by the command processing module 365. In the embodiment shown, the mapping 500 maps inputs received from an inceptor device (e.g., the inceptor device 240) and a gesture interface (e.g., the gesture interface 220) to corresponding aircraft trajectory values. The inceptor device is configured for forward, rearward, rightward, and leftward deflection and clockwise and counterclockwise twists, and includes a thumbwheel that can receive positive or negative adjustment. The gesture interface is configured to receive single, double, and triple finger touch inputs. The mapping 500 is intended for the purpose of illustrations only, and other mappings may map inputs received from the same or different interfaces to fewer, additional, or different universal aircraft trajectory values.

As depicted in FIG. 5, a forward deflection 505 of the inceptor device and a swipe up with one finger 510 on the gesture interface both map to a forward speed value increase. A rearward deflection 515 of the inceptor device and a swipe down with one finger 520 on the gesture interface both map to a forward speed value decrease. A thumb wheel positive input 525 on the inceptor device and a swipe up with three fingers 530 on the gesture interface both map to a vertical rate value increase. A thumb wheel negative input 535 on the inceptor device and a swipe down with three fingers 540 on the gesture interface both map to a vertical rate value decrease. A rightward deflection 545 of the inceptor device and a right swipe with one finger 550 on the gesture interface both map to a clockwise adjustment to a heading value. A leftward deflection 555 of the inceptor device and a left swipe with one finger 560 on the gesture interface both map to a counterclockwise adjustment to a heading value. A clockwise twist 565 of the inceptor device and a clockwise twist with two fingers 570 on the gesture interface both map to a clockwise adjustment to a turn value. A counterclockwise twist 575 of the inceptor device and a counterclockwise twist with two fingers 580 on the gesture interface both map to a counterclockwise adjustment to a turn value.

As described above with reference to the universal vehicle control interfaces 110, the mapping 500 may adjust according to a phase of operation of the aircraft. For instance, the rightward deflection 545 and the swipe right with one finger 550 may map to a lateral movement for a rotorcraft (e.g., a strafe) if the rotor craft is hovering. Similarly, the rightward deflection 545 and the swipe right with one finger 550 may be ignored for a fixed-wing aircraft if the fixed-wing aircraft is grounded.

Figure 6A:
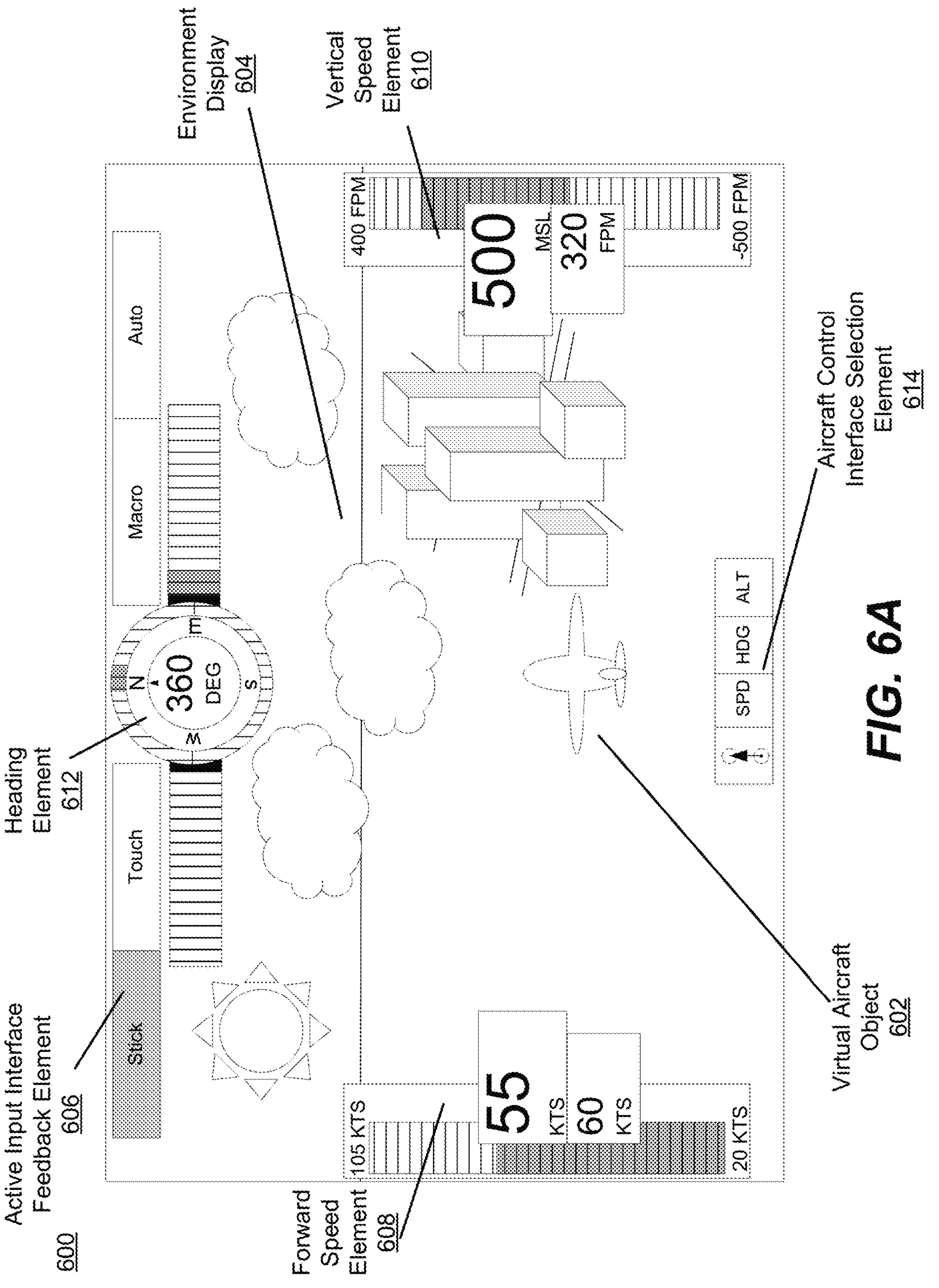
FIG. 6A illustrates one example embodiment of a first aircraft state interface.

FIG. 6A illustrates one embodiment of a first aircraft state interface 600. The aircraft state interface 600 may be an embodiment of a universal vehicle control interface 110 provided by the vehicle control and interface system 100. For example, the aircraft state interface 600 may be an embodiment of an interface displayed by the vehicle state display 230, such as the multi-function interface 220. In other cases, the aircraft state interface 600 may be provide for display on a virtual reality (VR) or augmented reality (AR) headset, overlaying a portion of the windshield of an aircraft, or any other suitable display mechanism.

In the embodiment shown, the aircraft state interface 600 includes a visualization of a virtual aircraft object 602 representative of a state of a physical aircraft. As depicted in FIG. 6A the virtual aircraft object represents a fixed-wing aircraft (e.g., an airplane), such as if the physical aircraft is a fixed-wing aircraft. In other cases, the virtual aircraft object 602 may represent other aircraft, vehicles, or other suitable objects or shapes (e.g., an arrow). The virtual aircraft object 602 may be adjusted (e.g., by the vehicle control and interface system 100) based on changes to the state of the physical aircraft. For example, responsive to determining that the physical aircraft is turning left, the vehicle control and interface system 100 may adjust the display of the virtual aircraft object 602 to visualize a left turn. In this way, the aircraft state interface 600 can provide visual feedback to a human operator of the visual aircraft. In some cases the virtual aircraft object 602 is displayed in a fixed location (e.g., illustrating or excluding orientation) with the surroundings continuously shifting relative to the aircraft (e.g., fixed aircraft position $3_{rd}$ person view), or the display of the virtual aircraft object 602 can move relative to the surroundings (e.g., over a map, over a ground track, over a rendered environment, within a predetermined deviation from a central position, etc.). Additionally, or alternatively, the virtual aircraft object 602 may not be included in the aircraft state interface 600 and the aircraft state interface 600 can instead, e.g., depict a first-person view (e.g., mimicking the view out of the cockpit) of the environment display 604, as described below.

The aircraft state interface 600 further includes an environment display 604. The environment displays 604 represents a physical environment in which the physical aircraft is operating. As depicted in FIG. 6A, the environment display 604 includes a rendering of various environmental features, for example, a sun position, clouds position, building locations, and a ground plane. The features of the physical environment 604 may be virtually rendered using various techniques, such as using virtual objects, augmented reality (e.g., map or satellite images), or some combination thereof. In some embodiments, the environment display 604 is augmented with virtual objects to convey various information to a human operator of the physical aircraft. For instance, the environment display 604 can include a forecasted flightpath for the physical aircraft or a set of navigational targets delineating a planned flightpath for the physical aircraft, as described in greater detail below with reference to FIGS. 6B and 6C. The environment display 604 can additionally or alternatively include other visual elements.

In some embodiments, the vehicle control and interface system 100 generates the environment display 604 based on a computer vision pose of the physical aircraft (e.g., of the current aircraft conditions, global aircraft position or orientation). The pose can be determined based on GPS, odometry, trilateration from ground fiducials (e.g., wireless fiducials, radar fiducials, etc.), or other signals. The vehicle control and interface system 100 may generate the environment display 604 from suitable terrain database, map, imaging or other sensor data generated by the physical aircraft, or other suitable data. As an example, the vehicle control and interface system 100 may select a map segment using the aircraft pose, determine an augmented field of view or perspective, determine augmented target placement, determine pertinent information (e.g., glideslope angle), determine a type of virtual environment (e.g., map vs rendering), or any other suitable information based on the pose of the physical aircraft. The environment display 604 can be pre-rendered, rendered in real time (e.g., by z-buffer triangle rasterization), dynamically rendered, not rendered (e.g., 2D projected image, skin, etc.) or otherwise suitably generated relative to the view perspective.

The aircraft state interface 600 further includes a set of interface elements overlaying the environment display 604. The set of interface elements include an active input feedback interface element 606, a forward speed element 608, a vertical speed element 610, a heading element 612, and an aircraft control interface selection element 614.

The active input feedback interface element 608 indicates an aircraft interface that is currently providing aircraft control inputs, such as one of the aircraft interfaces 305. As depicted in FIG. 6A, a side-stick inceptor device (e.g., the side-stick inceptor device 240) is currently providing input, as indicated by the grey highlight of the box labeled "stick."

The forward speed element 608, the vertical speed element 610, and the heading element 612 each include information indicating a current aircraft control input value and information indicating a respective value for a current state of the aircraft.

In particular, the forward speed element 608 includes a vertical bar indicating a possible forward speed input value range from 20 knots (KTS) to 105 knots, where the grey bar indicates a current forward speed input value of 60 KTS. The forward speed element 608 also includes a bottom text box including text indicating the current forward speed input value. Further, the forward speed element 608 includes a top text box indicating a current forward speed value for the aircraft of 55 KTS.

Similar to the forward speed element 608, the vertical speed element 610 includes a vertical bar indicating a possible vertical speed input value range from −500 feet per minute (FPM) to 500 to 400 FPM, where the grey bar indicates a current vertical speed input value of 320 FPM. The vertical speed element 610 also includes a bottom text box including text indicating the current vertical speed input value. Further, the vertical speed element 610 includes a top text box indicating a current altitude value for the aircraft of 500 feet above mean sea level (MSL).

The heading element 612 includes a virtual compass surrounded by a circular bar indicating a possible heading input value range from −360 degrees (DEG) to +360 DEG. where the grey bar indicates a current heading input value of +5 DEG. The heading element 612 further includes horizontal bars on either side of the circular bar indicating the range of possible heading input values and a grey bar indicating the current heading input value. The virtual compass of the heading element 612 indicates a current heading value for the aircraft of 360 DEG.

The aircraft control interface selection element 614 facilitates selection of an aircraft control interface from a set of four aircraft control interfaces. As depicted in FIG. 6A, the set of aircraft control interfaces 614 include aircraft control interfaces that can receive through the aircraft state interface 600 or another digital interface. In particular, the set of aircraft control interfaces include a gesture interface for receiving gesture touch inputs (as indicated by an interface element including an icon illustrating a single finger upward swipe), a forward speed macro for receiving a requested aircraft forward speed (as indicated by an interface element labeled "SPD"), a heading macro for receiving a requested aircraft heading (as indicated by an interface element labeled "HDG"), and an altitude macro for receiving a requested aircraft altitude (as indicated by an interface element labeled "ALT"). As an example, a user of the aircraft state interface 600 may select from the set of aircraft control interfaces by via touch inputs (e.g., taps) on the respective interface elements).

In some embodiments, the aircraft state interface 600 or another interface may display additional interface elements corresponding to a selected aircraft control interface from the set of aircraft control interfaces. For example, if the gesture interface is selected the aircraft state interface 600 may display an additional interface including illustrations of the gesture touch inputs for providing universal aircraft control inputs, such as illustrations similar to those depicted in FIG. 4. Similarly, if the forward speed, heading or altitude macro are selected the aircraft state interface 600 may display respective additional interfaces including interface elements for receiving information describing a requested aircraft state, such as a requested forward velocity, a requested heading, or a requested altitude, respectively. In one embodiment, the aircraft state interface 600 displays the additional interfaces corresponding to a selected aircraft control interface in a drop-down interface extending below the aircraft state interface 600 as depicted in FIG. 6A.

Figure 6B:
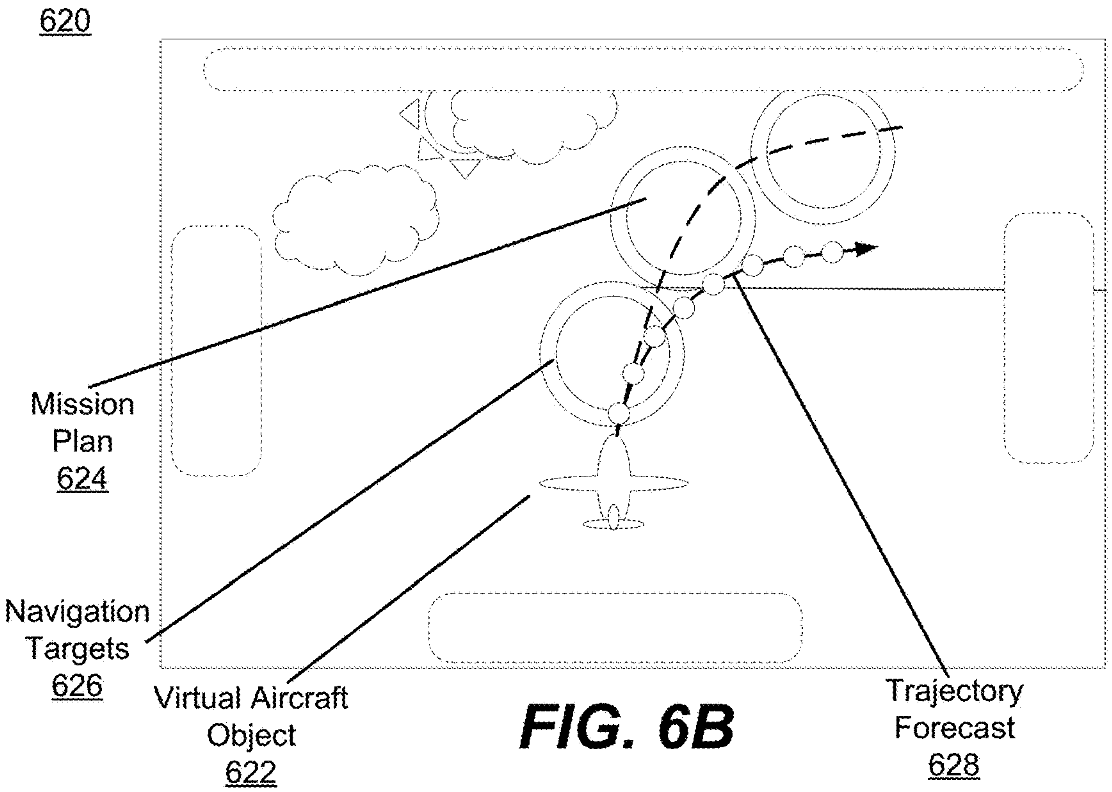
FIG. 6B illustrates one example embodiment of a second aircraft state interface.

FIG. 6B illustrates one embodiment of a second aircraft state interface 620. As with the aircraft state interface 600, the aircraft state interface 620 may be an embodiment of a universal vehicle control interface 110 provided by the vehicle control and interface system 100. Also similar to the aircraft state interface 600, the aircraft state interface 620 includes a virtual aircraft object 622, an environment display, and various interface elements (as indicated by the dashed rectangles). As such, the description of these features of the aircraft state interface 600 are also applicable to these features of the aircraft state interface 620.

As depicted in FIG. 6B, the aircraft state interface 620 additionally includes a set of virtual objects augmenting the environment display to facilitate navigation of a physical aircraft corresponding to the virtual aircraft object 622. The set of virtual objects includes a mission plan 624, navigation targets 626, and a trajectory forecast 628. The mission plan 624 indicates a current mission plan for the physical aircraft in the environment display, such as a mission to navigate the aircraft from a starting location to a target location. In particular, the mission plan 624 is a 3D line indicating a flight path for achieving the mission plan. The navigation targets 626 are 3D rings along the mission plan 624 providing visual checkpoints for following the mission plan 624. For example, the navigation targets 626 may be suitable for zero-visibility situations (e.g., while the physical aircraft is in a cloud, in fog, at night, during a storm, etc.), where conventional visual cues are otherwise unavailable to the operator. Other examples of navigation targets 626 may be gates, annulus, torus, hoops, disks, or any other suitable shape indicating a discrete checkpoint. The trajectory forecast 628 indicates a current trajectory of the physical aircraft in the environment display based on a current state of the physical aircraft. For example, a human operator of the aircraft may deviate from the mission plan 624 by controlling one or more universal input vehicle controllers (e.g., the gesture interface 320 or the stick inceptor device 315). In this way, the trajectory forecast 628 provides visual feedback to the human operator to indicate the result of universal control inputs on a trajectory of the aircraft. The vehicle control and interface system 100 may determine the trajectory forecast 628 in consideration of current wind conditions for the physical aircraft. In different flight phases of the aircraft, additional indicators may appear to help a human operator of the physical aircraft provide inputs for efficient takeoffs or landings.

In alternative embodiments than those depicted in FIG. 6B, the trajectory forecast 628 includes a ground trajectory visualization in addition or alternatively an air trajectory visualization similar to the trajectory forecast 628 depicted in FIG. 6B. For example, the ground trajectory visualization and the air trajectory visualization may parallel lines extending out from the virtual aircraft object 622 and projecting along the ground and into the air of the environment display of the aircraft state interface 620, respectively.

Figure 6C:
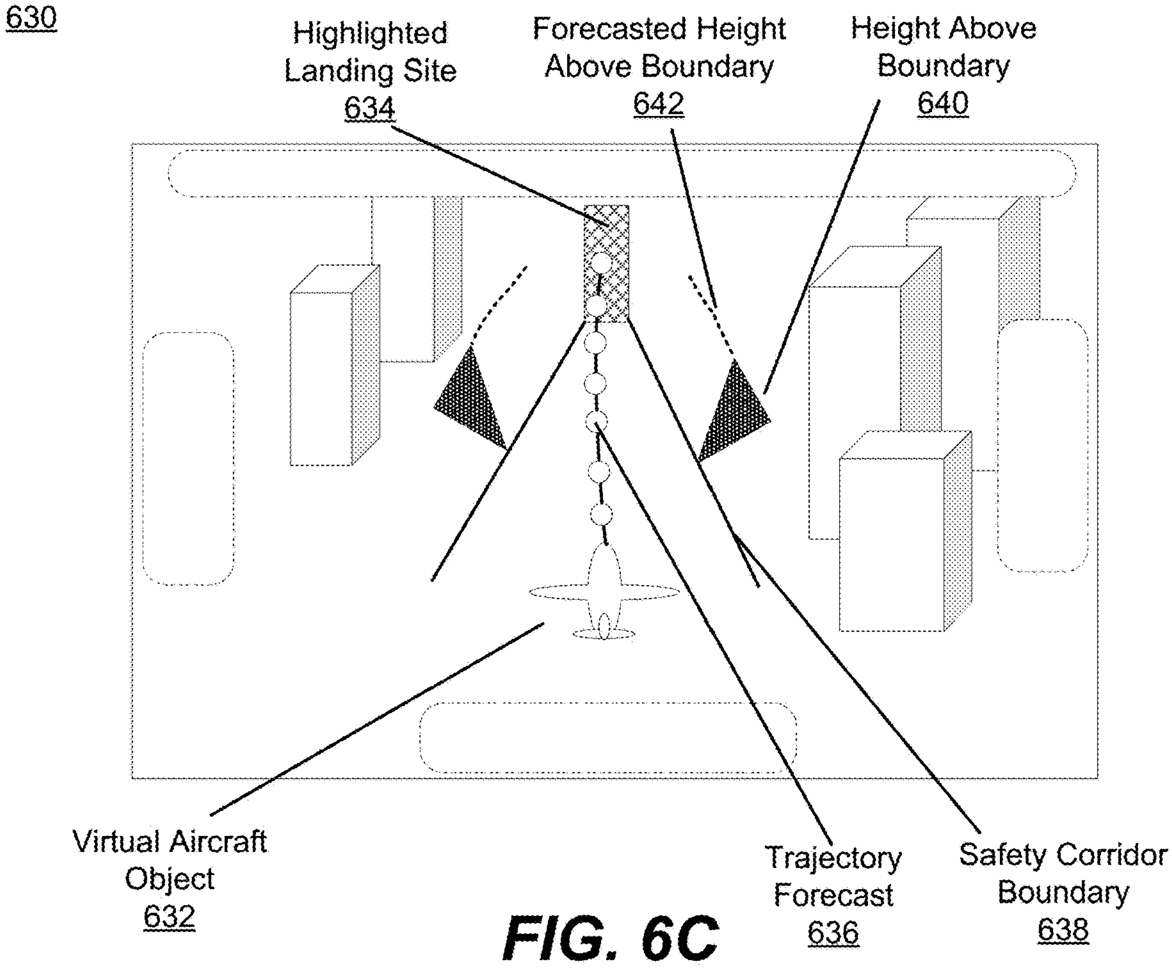
FIG. 6C illustrates one example embodiment of a third aircraft state interface.

FIG. 6C illustrates one embodiment of a third aircraft state interface 630. As with the aircraft state interfaces 600, the aircraft state interface 630 may be an embodiment of a universal vehicle control interface 110 provided by the vehicle control and interface system 100. Also similar to the aircraft state interface 630, the aircraft state interface 630 includes a virtual aircraft object 632, an environment display, and various interface elements. As such, the description of these features of the aircraft state interface 600 are also applicable to these features of the aircraft state interface 650.

As depicted in FIG. 6C, the aircraft state interface 640 additionally includes a set of virtual objects augmenting the environment display to facilitate a landing of a physical aircraft corresponding to the virtual aircraft object 632. The set of virtual objects includes a highlighted landing site 634, a trajectory forecast 636, a safety corridor boundary 638, a height above boundary 640, and a forecasted height above boundary 642. The highlighted landing site 634 indicates a location in the environment display corresponding to a physical landing site for the physical aircraft, such as a landing site selected by an operator of the physical aircraft via the aircraft state interface 630. As with the trajectory forecast 628, the trajectory forecast 636 indicates a current trajectory of the physical aircraft in the environment display based on a current state of the physical aircraft. As depicted in FIG. 6C, the trajectory forecast 636 indicates that the physical aircraft is on a trajectory to land at the highlighted landing site 634. The safety corridor boundary 6638 provides a visual indication in the environment display of a corridor within which the physical aircraft can safely navigate. The height above boundary 640 indicates a minimum altitude as a triangular wall projected onto a surrounding terrain topography (e.g., the buildings on either side of the safety corridor boundary 638). Similarly, the forecasted height above boundary 642 indicates a forecasted minimum altitude as a line extending away from the height above boundary 640 in the direction the virtual aircraft object 632 is directed to. More generally, the vehicle control and interface system 100 can determine or display boundaries corresponding to lane-lines, tunnels (e.g., wireframe), virtual 'bumpers,' translucent 'walls' or other suitable boundaries. Such boundary interface elements can provide improved awareness or visualization relative to a 'path' in 3D-space, since it can be easier for an operator to interpret the relative location of a discrete target (or stay within a lane in the continuous case) than to track to a point, line, or curve in 3D space-which can be difficult for a user to parse on a 2D screen even from a perspective view.

Figure 6D:
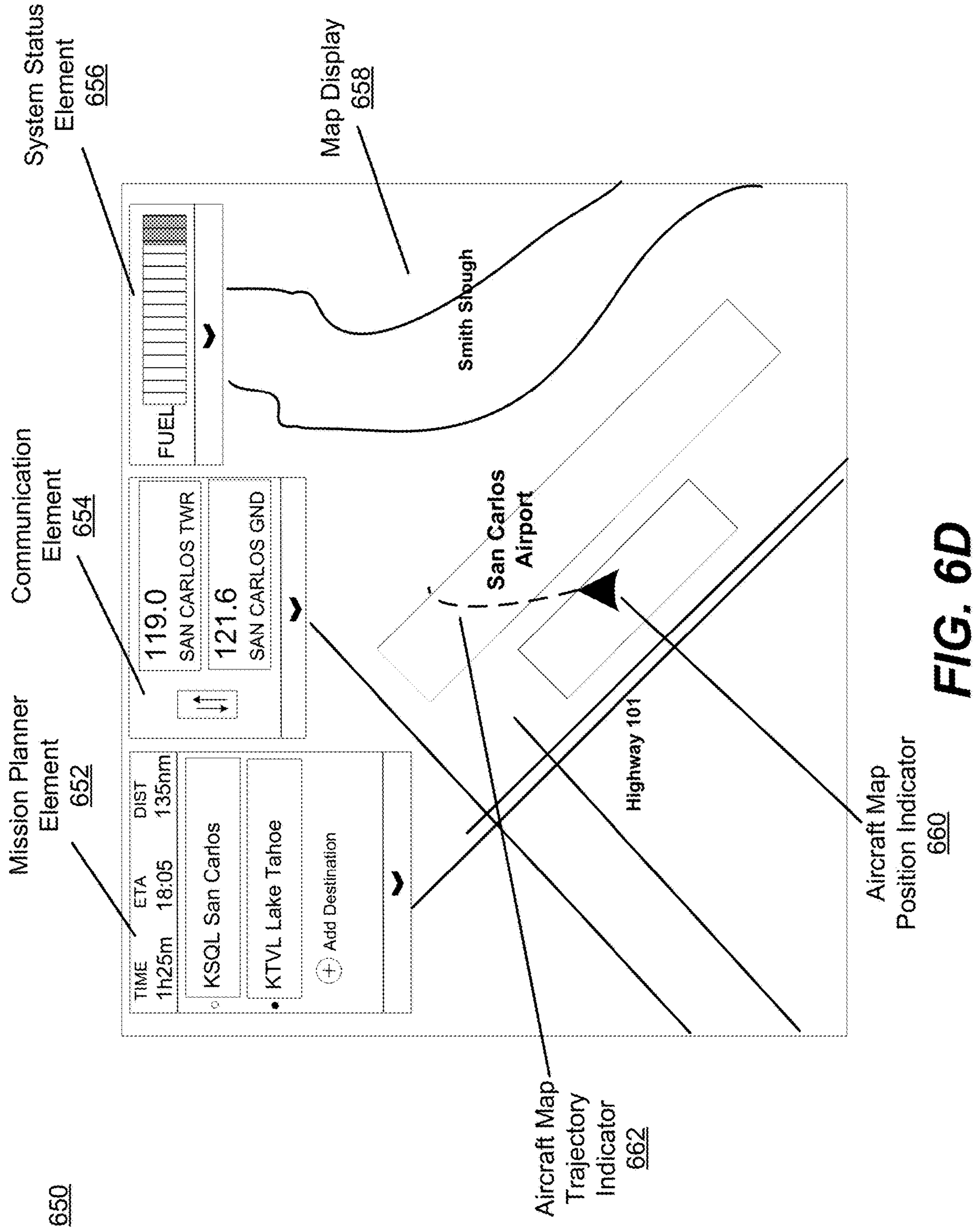
FIG. 6D illustrates one example embodiment of a fourth aircraft state interface.

FIG. 6D illustrates one embodiment of a fourth aircraft state interface 650. The aircraft state interface 650 may be an embodiment of a universal vehicle control interface 110 provided by the vehicle control and interface system 100. For example, the aircraft state interface 650 may be an embodiment of the multi-function interface 220. As depicted in FIG. 6D, the aircraft state interface 650 includes a mission planner element 652, a communication element 654, a system health element 656, a map display 658, an aircraft map position 660, and an aircraft map trajectory 662.

The mission planner element 652 facilitates interaction with navigation information, such as a routing database, inputting an origin or destination location, selecting intermediary waypoints, etc. As depicted in FIG. 6D, the mission planner element 652 includes information describing a route including two destinations (KSQL San Carlos and KTVL Lake Tahoe). The mission planner element 652 further includes route statistics (e.g., time to destination, estimated time of arrival (ETA), and distance to destination). In other cases, the mission planner element 652 may include other metadata about the route (e.g., scenic characteristics, relative length, complexity, etc.). In some embodiments, the mission planner element 652 includes information describing available destination locations, such as fueling or weather conditions at or on the way to a destination location.

The communication element 654 includes information describing relevant radio frequencies. For instance, the relevant radio frequencies may be based on a current position of the aircraft, a current mission for the aircraft, or other relevant information. In the same or different embodiments, the communication element 654 may include other communication-related information.

The system status element 656 includes information describing a status of the aircraft determined according to an estimated state of the aircraft (e.g., the estimated aircraft state 340). As depicted in FIG. 6D, the internal system status element 656 includes an indicator of a current fuel level for the aircraft. The system status element may display a status for a particular component of the aircraft responsive to the status meeting a threshold indicating the status is pertinent. In this way, the system status element 656 may dynamically provide notifications describing a component status to an operator of the vehicle after it becomes pertinent. For example, the current fuel level may be displayed on the system status element 656 responsive to the estimated state of the aircraft indicating the fuel level has dropped below a threshold fuel level. Other indicators the internal system status element 656 may include are indicators describing powerplant data, manifold pressure, cylinder head temperature, battery voltage, inceptor status, etc. In some cases, a full or partial list of aircraft component status may be accesses as a dropdown menu by interacting with the downward arrow on the system status element 656.

In some embodiments, some or all of the mission planner element 652, the communication element 654, or the system health element 656 are not persistently included on the aircraft state interface 650. Instead, the aircraft interface 650 is adjusted (e.g., by the vehicle control and interface system 100) to include some or all of these elements in response to triggers or events. In the same or different embodiments, the mission planner element 652, the communication element 654, or the system health element 656 are not persistently included on the aircraft state interface 650 include pertinent information. Pertinent information represents a limited set of information provided for display to the human operator at a particular time or after a particular event. For example, a human operator can be relied upon to process information or a direct attention according to a prioritization of: 1. aviate; 2. navigate; and 3. communicate. As only a subset of information describing a state of the physical aircraft is required for each of these tasks, the human operator can achieve these tasks more efficiently if pertinent information is displayed and irrelevant information is not displayed, which can be extraneous or distracting for the human operator. Pertinent information can include various apposite parameters, notifications, values, type of visual augmentation (e.g., two dimensional (2D), two and a half dimensional (2.5D), three dimensional (3D), augmentation mode, virtual environment.

The map display 658 is a virtual geographical map including an aircraft map position indicator 660 and an aircraft map trajectory indicator 662. The map display 658 includes virtual geographical data for a geographical region. The map display 658 may be generated using map data from various map databases. The aircraft map trajectory indicator 660 provides a visual indication of a geographical location of the aircraft relative to the geographical region displayed by the map display 658. Similarly, the aircraft map trajectory indicator 662 provides a visual indication of a trajectory of the aircraft in the geographical region of the map display 658. For example, the aircraft map trajectory 662 may be a 2D projection of the trajectory forecasts 628 or 636.

The particular interface elements depicted in FIGS. 6A-6D are selected for the purpose of illustration only, and one skilled in the art will appreciate that the interfaces 600, 620, 630, and 650 can include fewer, additional, or different interface elements arranged in the same or different manner.

Emergency Management

As previously described the vehicle control and interface system 100 may include an emergency module 160. The emergency module 160 is designed to reduce, among other things, the number of fatal air vehicle incidents attributed to user (e.g., pilot) error. The emergency module 160 can more accurately interpret air vehicle issues and can take (e.g., immediate) corrective actions (e.g., in a safer, more accurate, and repeatable basis) while still allowing the user to have agency over the air vehicle. The emergency module 160 may also provide notifications to the user that help the user make informed and intelligent decisions without providing excessive information that may slow or overwhelm the user's decision-making process.

Figure 7:
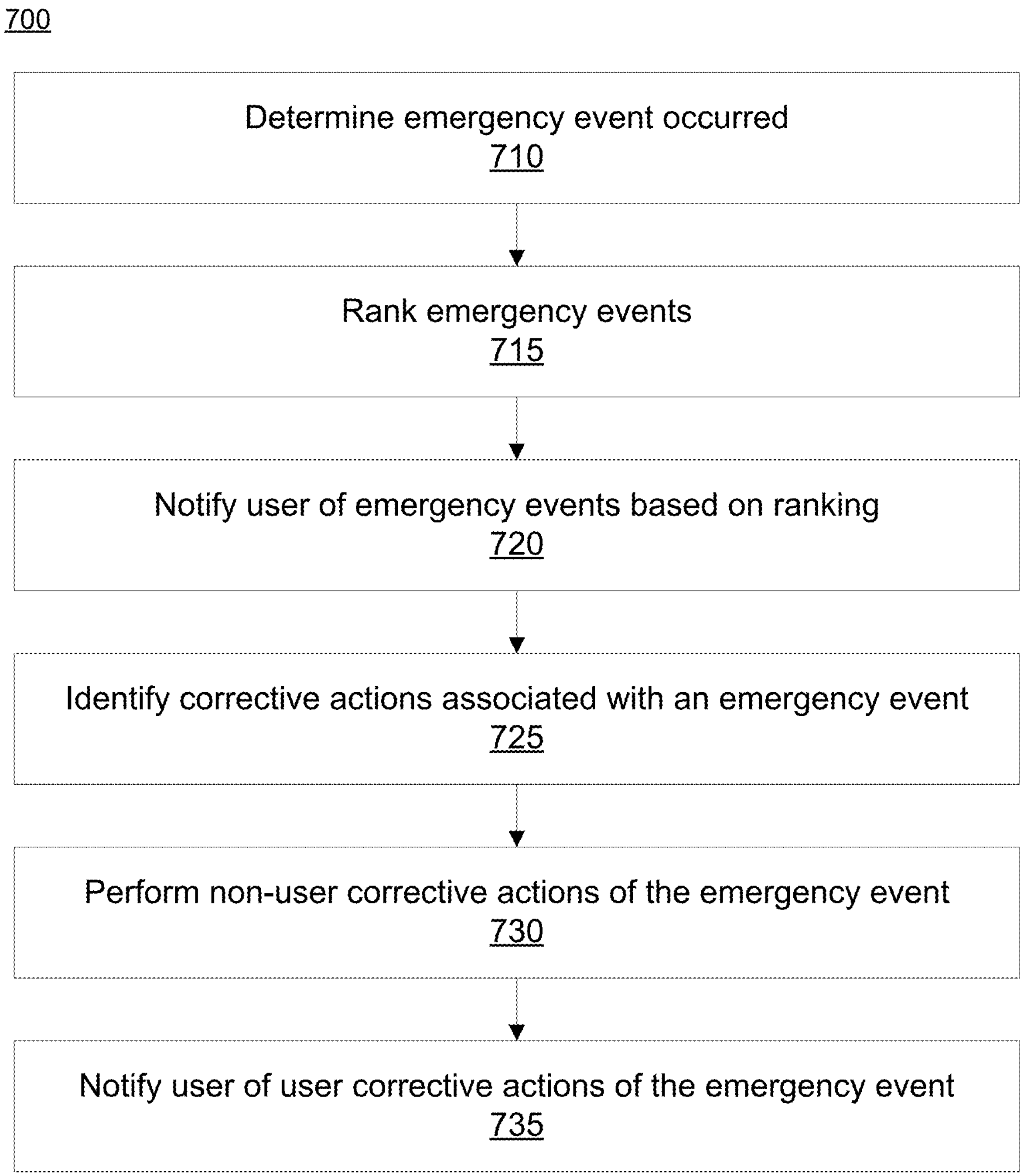
FIG. 7 is a flowchart of a method for detecting and managing an emergency event, according to an embodiment.

FIG. 7 is a flowchart of a method 700 for detecting and managing one or more emergency events using the emergency module 160, according to some embodiments. In the example of FIG. 7, the method 700 is performed from the perspective of the emergency module 160. The method 700 can include greater or fewer steps than described herein. Additionally, the steps may be performed in a different order. Among other advantages, method 700 allows the user (e.g., pilot) to guide the vehicle to a safe state without relying on the user to interpret and initiate the emergency procedure to perfection.

At step 710, the emergency module 160 determines one or more emergency events have occurred. As described herein, an emergency event refers to an event that (1) occurred and (2) requires corrective action to prevent or reduce damage to the vehicle, the user (e.g., pilot) of the vehicle, passengers of the vehicle, or some combination thereof. An example emergency event is a low-g event. An emergency event may refer to a critical failure of a component of the vehicle. For example, the loss of tail rotor thrust on a rotorcraft may be referred to as an emergency event. Other examples include loss of engine power and loss of governor control (e.g., the engine is no longer able to provide enough torque to keep the vehicle at the current altitude). The emergency module 160 may determine the occurrence of an emergency event by analyzing data from a vehicle sensor (e.g., 140). For example, an emergency event may be detected using an algorithm in conjunction with sensor data from one or more sensors. In some embodiments, the emergency module 160 is configured to determine emergency events specified in a pilot operating handbook (POH) or other certification manual.

At step 715, the emergency module 160 ranks the determined emergency events (assuming multiple events were detected at step 710) according to importance level. For example, the highest ranked emergency events may have the highest importance levels. The importance level of an event may be a function of (1) the level of potential danger to the user or passengers if the corrective action isn't performed or (2) the level of urgency to perform the corrective action.

At step 720, the emergency module 160 notifies a user of one or more emergency events based on the ranking from step 715. The user may be notified via a notification on a user interface on a display (e.g., 210) (e.g., the emergency module 160 sends a notification for display on a display). In another example, the user is notified via an aural notification (e.g., the emergency module 160 sends a notification to an aural device (e.g., speaker system)). In some embodiments, the user is notified via a crew alerting system indication on a primary flight display. Specific example notifications include notifying the user that the vehicle just experienced a low-g event, or the vehicle is currently experiencing loss of tail rotor effectiveness.

Performing step 720 may result in a limited number of emergency events being presented to a user. For example, only the emergency event with the highest importance is presented to the user. In other examples, only emergency events with a threshold level of importance are presented to the user or only a threshold number of the emergency events are presented to the user (a threshold number of the highest ranked events). Among other advantages, the limited number of emergency event notifications allows the user (e.g., pilot) to focus on the important events first without being distracted by less important events, thus decreasing the likelihood of the user misinterpreting the situation or performing an error.

At step 725, the emergency module 160 identifies corrective actions associated with an emergency event presented to the user in step 720 (e.g., based on the type of emergency event). One or more of the corrective actions may be specified by a pilot operating handbook (POH) or other certification manuals for the specific emergency event. The corrective actions may be part of an emergency procedure associated with the emergency event. These actions may be divided into two categories: user actions (e.g., pilot actions) and non-user actions (e.g., non-pilot actions). User actions are corrective actions that should be or must be performed by the user. Non-user actions are corrective actions that the emergency module 160 is capable of performing (e.g., without the user's input or guidance). A non-user action may be implemented by the emergency module 160 communicating with the automated aircraft control module 335. For example, the automated aircraft control module 335, responsive to receiving an indication of a non-user action from the emergency module 160, generates control inputs (e.g., 330) suitable for accomplishing the non-user action.

At step 730, the emergency module 160 performs one or more of the non-user actions identified in step 725. The non-user actions to be performed, currently being performed, completed by the emergency module 160, or some combination thereof may be presented to the user to keep them informed. In some embodiments, these automated actions are triggered by designated fly-by-wire sensors collectively interpreted and voted the emergency module 160, and in compliance with the certified air vehicle flight manual emergency procedures. Example non-user actions are described in the context of a low-g event for a rotorcraft. In a low-g event, the rotorcraft experiences "low-g" (a vertical acceleration which makes the user (e.g., pilot) feel light in their seat). This event causes the rotor disk to become unloaded which can cause rotor mast to bump and separate the rotor from the airframe. The corrective action in this case is to reload the rotor disk by applying a quick pitch up maneuver and slowing down. In this case, the emergency module 160 may automatically detect the low-g event when it occurs and (e.g., immediately) applies this corrective action. An additional example non-user action is described in the context of autorotation. When the emergency module 160 detects the motor has failed, it may automatically enter the rotorcraft into an autorotation glide (e.g., by interacting with 335).

At step 735, the emergency module 160 notifies a user of one or more user actions identified in step 725 (e.g., the emergency module 160 sends a user action for display on a display). The notification may instruct the user how to perform the one or more user actions, thus decreasing the likelihood of the user misinterpreting the situation or performing an error. After the user performs one or more of the user actions, additional user actions may be provided to the user. Additionally, or alternatively, previously completed user actions may be provided to the user (e.g., displayed on a display) to remind the user of actions they already performed. Similar to step 720, the user may be notified via a notification (e.g., an alert) on a user interface or notified via an aural notification. For example, audible or visual cues notify the user when to flare in an autorotation. In some embodiments, the user is notified via a crew alerting system indication on a primary flight display.

Performing step 735 may result in a limited number of user actions being presented to a user. For example, only the next user action or a threshold number of user action notifications are presented to the user. Among other advantages, the limited number of user action notifications allows the user to focus on the next corrective action without being distracted by other (e.g., subsequent) corrective actions, thus decreasing the likelihood of the user performing an error. This also allows the user to effectively stay in control of the vehicle and assess the situation more accurately. For example, a display displays the most important user information to augment and accelerate the user's decision-making process with notifications such as "land immediately," "land as soon as possible," or "land as soon as practicable."

In addition to notifying a user of one or more user actions, step 735 may notify the user of useful information such as the vehicle has reached its max operating envelop limit. The user may be notified via a user interface or via an aural notification.

However, the emergency module 160 may provide these notifications when useful instead of showing all possible indications at all times. Many conventional cockpits are full of clutter, and most pilots have more information than needed during any given phase of flight. Contrary to this, in some embodiments, the emergency module 160 only provides the most important or necessary notifications (e.g., crew alerts) in the appropriate context (e.g., when the information is useful to the user and when the user may use the information to make decisions). The parameters of these curated, system diagnosed, and context-specific notifications are helpful to combine user augmentation and user agency in a manner that allows for more accurate fault interpretation and appropriate procedure execution. The specific thresholds (e.g., for sensor data) that the emergency module 160 uses to classify or identify an emergency event (e.g., rate of signal change or persistence of event) along with associated corrective actions enable the emergency module 160 to notify the right order of errors or corrective actions. This allows the user to perform the proper actions more quickly rather than be inundated with information. The innovative nature of moving away from a panel/list of warning alerts, and towards a series of popups/dialogs is a highlight of the emergency module 160 (e.g., context specific prompts are advantageous over a list with all faults listed simultaneously).

Depending on the number of detected emergency events and the corrective actions associated with those events, steps 730 and 735 may each be performed multiple times. Additionally, or alternatively, steps 730 and 735 may be performed sequentially, in parallel, alternately, or some combination thereof. Furthermore, steps 720-735 may be repeated until (e.g., all) corrective actions are performed for (e.g., all) the emergency events determined in step 710.

Figure 8A:
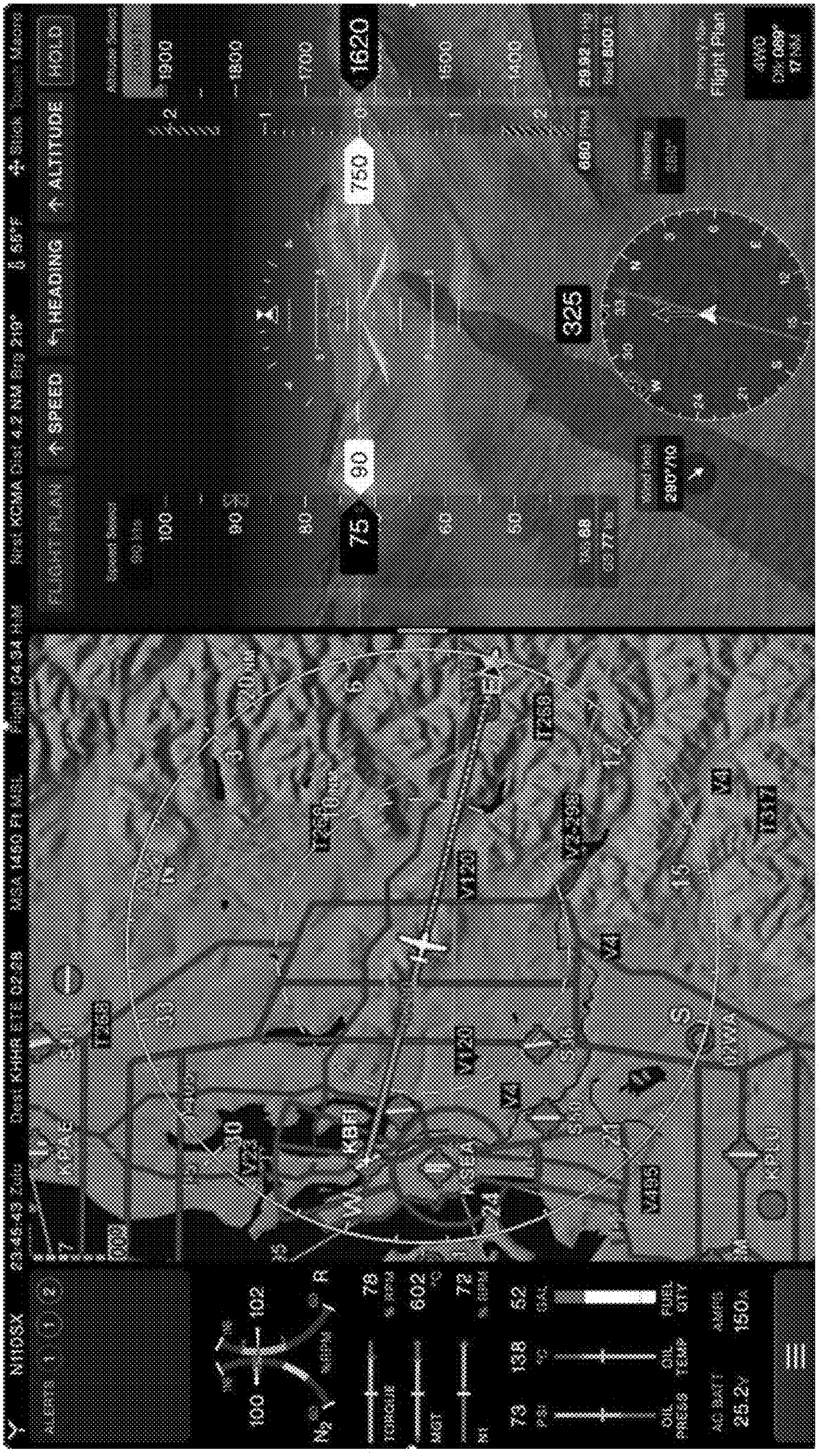
FIGS. 8A-8F illustrate user interfaces, according to some embodiments.

FIG. 8A is an example first interface 805 of a primary flight display that may be displayed to a user (e.g., via 210), according to some embodiments. Interface 805 may be displayed on a primary display and may be displayed during a nominal state. Since no emergency events have been detected, interface 805 does not include any crew alerts (which are examples of notifications that may be provided when an emergency event is determined).

Figure 8B:
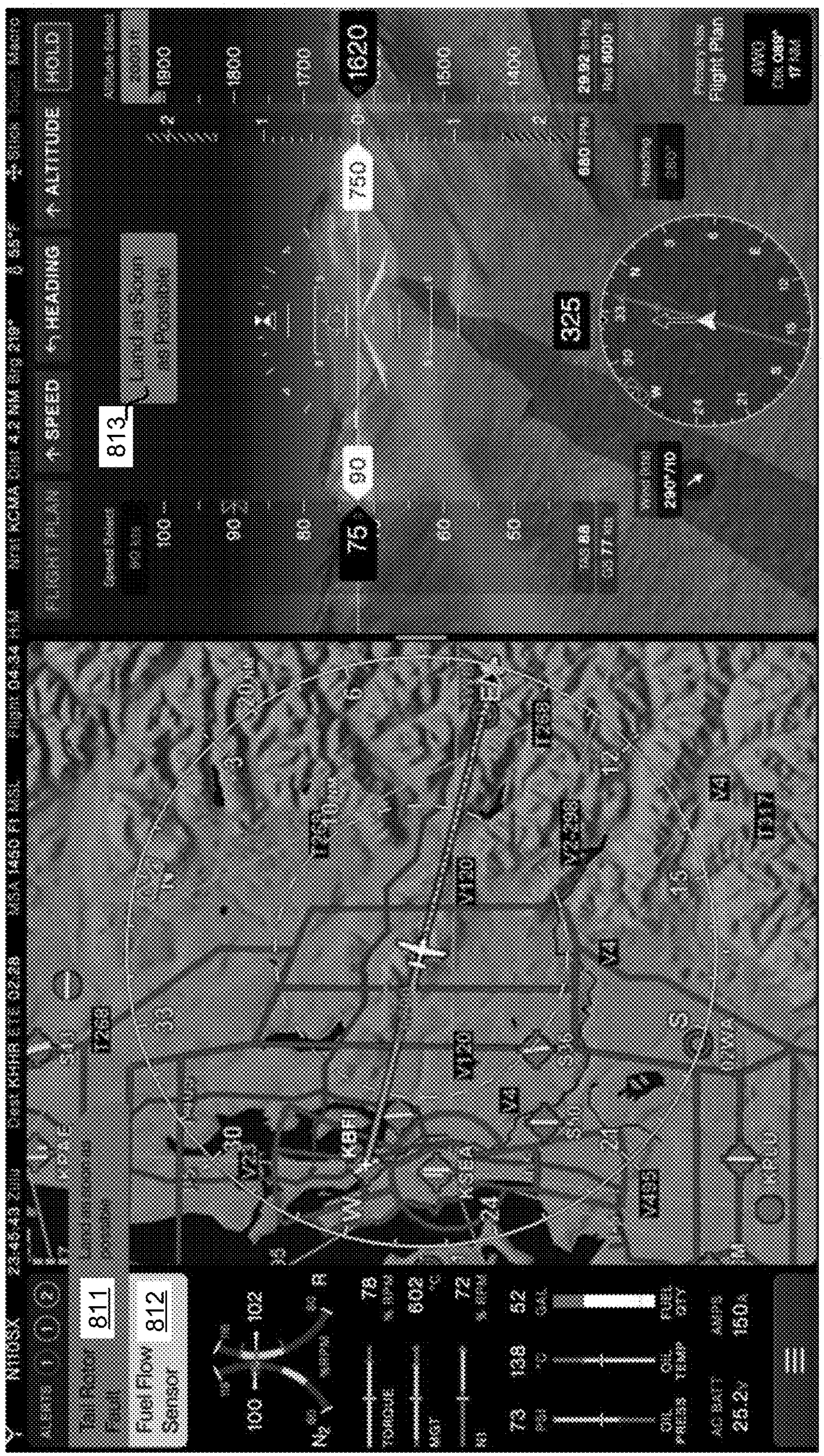

FIG. 8B is an example second interface 810 that may be displayed to a user (e.g., via 210), according to some embodiments. Interface 810 may be displayed on a primary flight display. Interface 810 is similar to interface 805 except interface 810 includes crew alerts (because an emergency event was detected). Crew alert 811 indicates there is a fault with a tail rotor of the vehicle and the user should land the vehicle as soon as possible. Alert 812 indicates the fuel flow sensor is low. Alert 813 also indicates the user should land the vehicle as soon as possible.

Figure 8C:
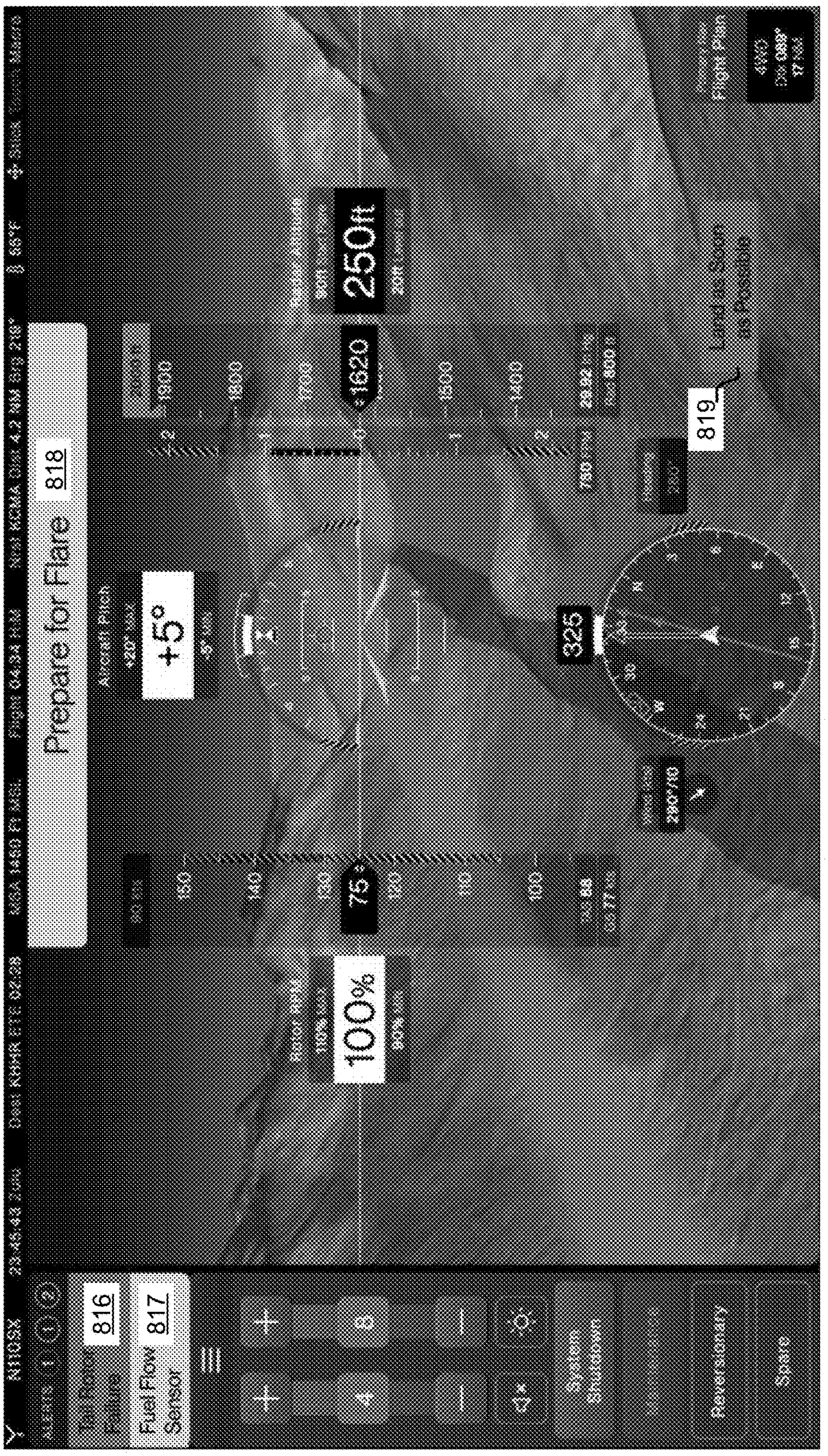

FIG. 8C is an example third interface 815 that may be displayed to a user (e.g., pilot), according to some embodiments. FIG. 8C is further described below with respect to autorotation.

Figure 8D:
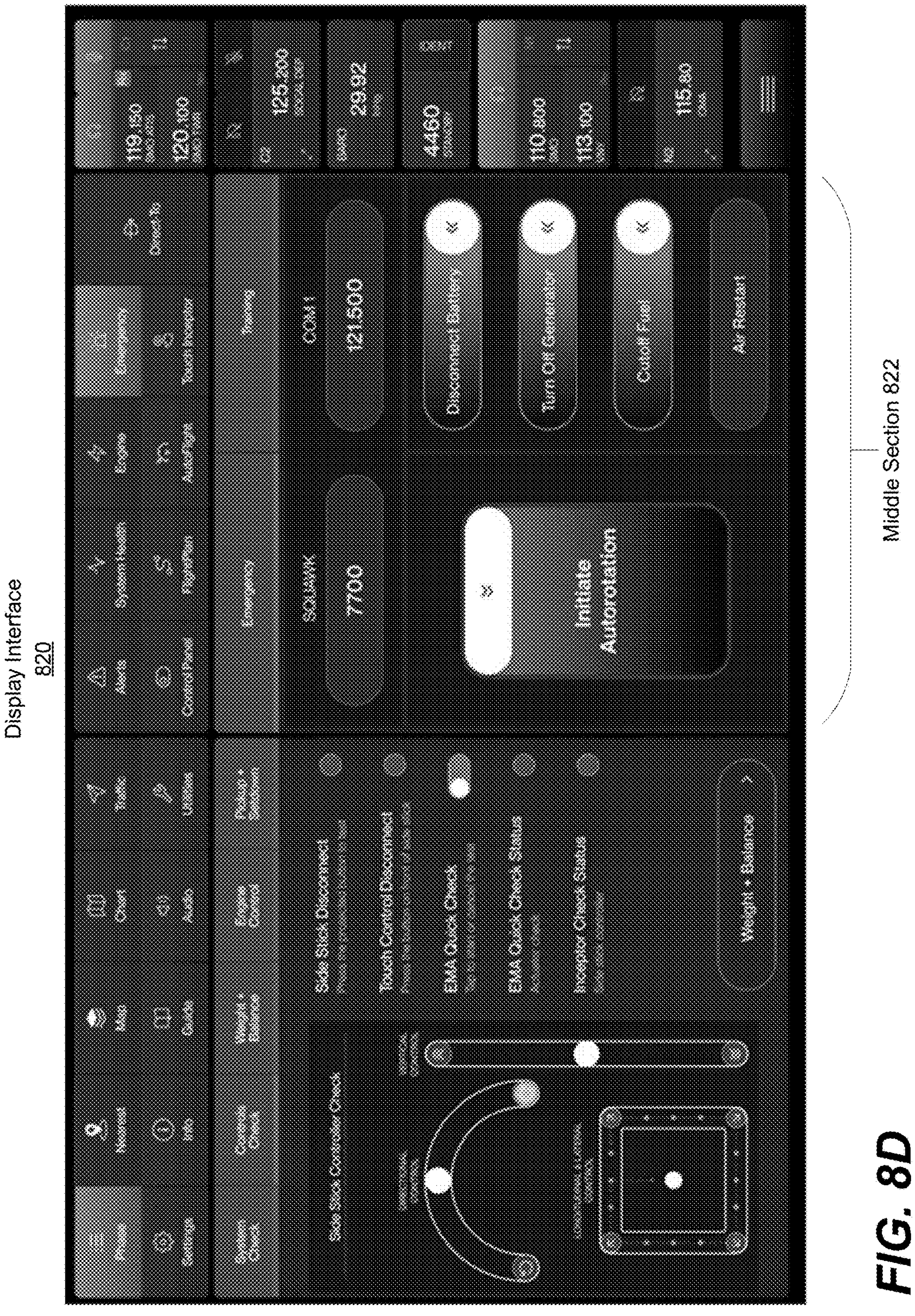
Figure 8E:
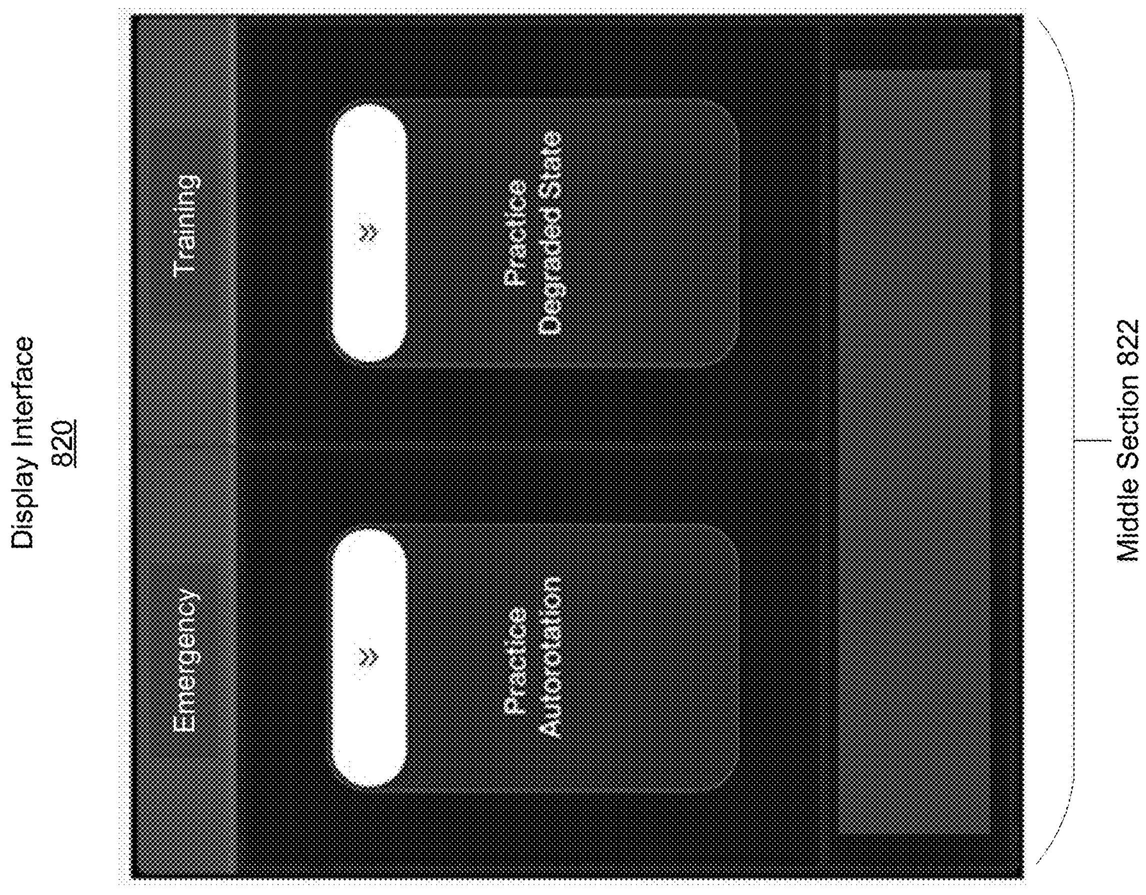

FIG. 8D is an example fourth interface 820 that may be displayed to a user (e.g., via 210), according to some embodiments. Interface 820 may be displayed on a multi-function display (e.g., adjacent to or near to a primary flight display). The interface 820 includes tabs across the top of the interface that allow the user to access functions grouped according to category. In the example of FIG. 8D, the middle section 822 of interface 820 is displaying functions of the emergency tab. If the emergency subtab is selected, the interface includes sliders (or other interactable interface elements) that enable a user to perform emergency functions, such as initiate an autorotation, disconnect the battery, turn off the generator, or cutoff fuel. FIG. 8E is the middle section 822 of the fourth interface 820 when the training subtab is selected. This section includes sliders that enable a user to initiate practice or simulated emergency situations, such as initiate a practice autorotation or practice operating the aircraft while in a degraded state.

Figure 8F:
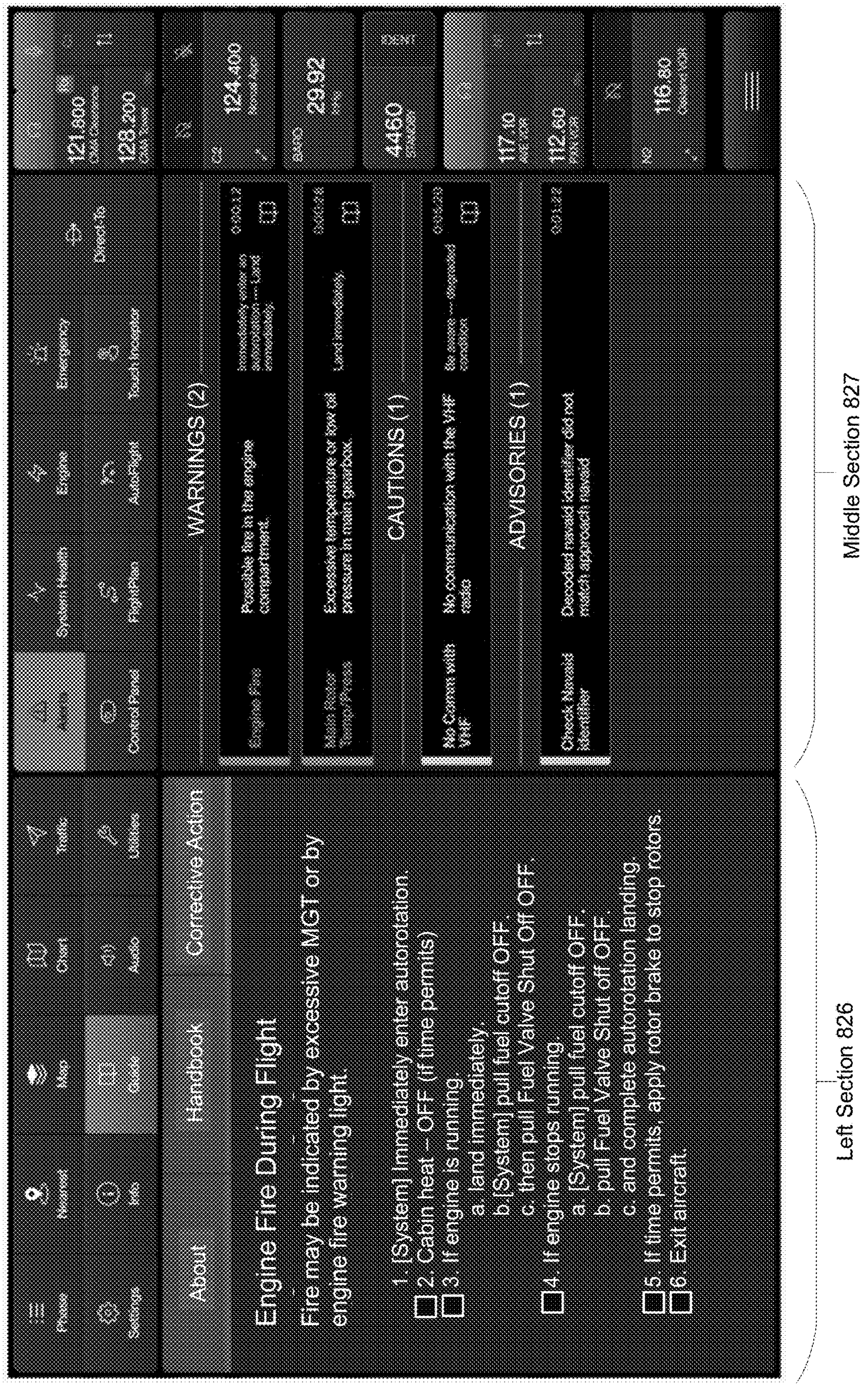
Figure 9A:
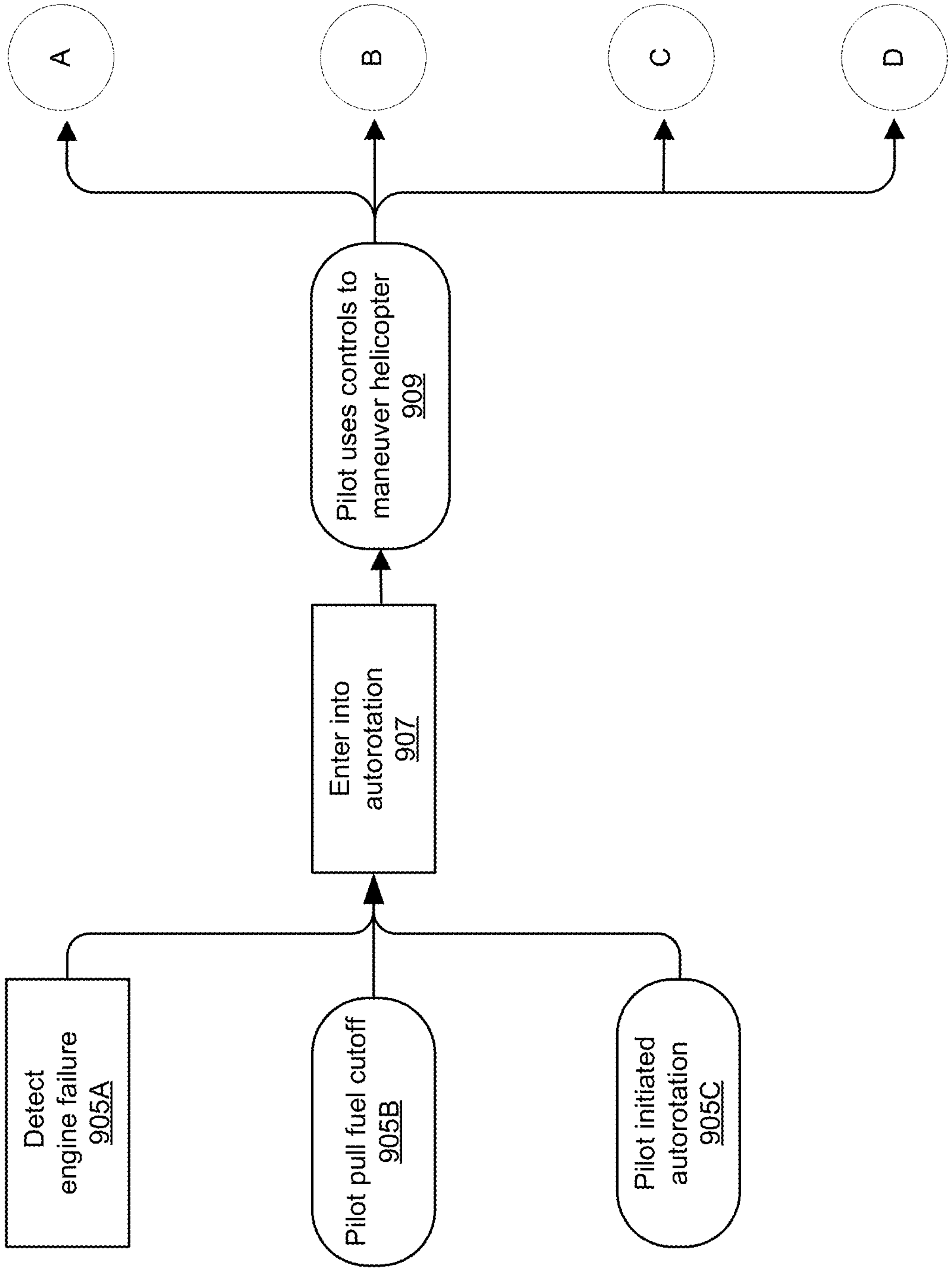
FIGS. 9A-9D are a flowchart of a method for performing an autorotation in a rotorcraft with the emergency module, according to an embodiment.
Figure 9B:
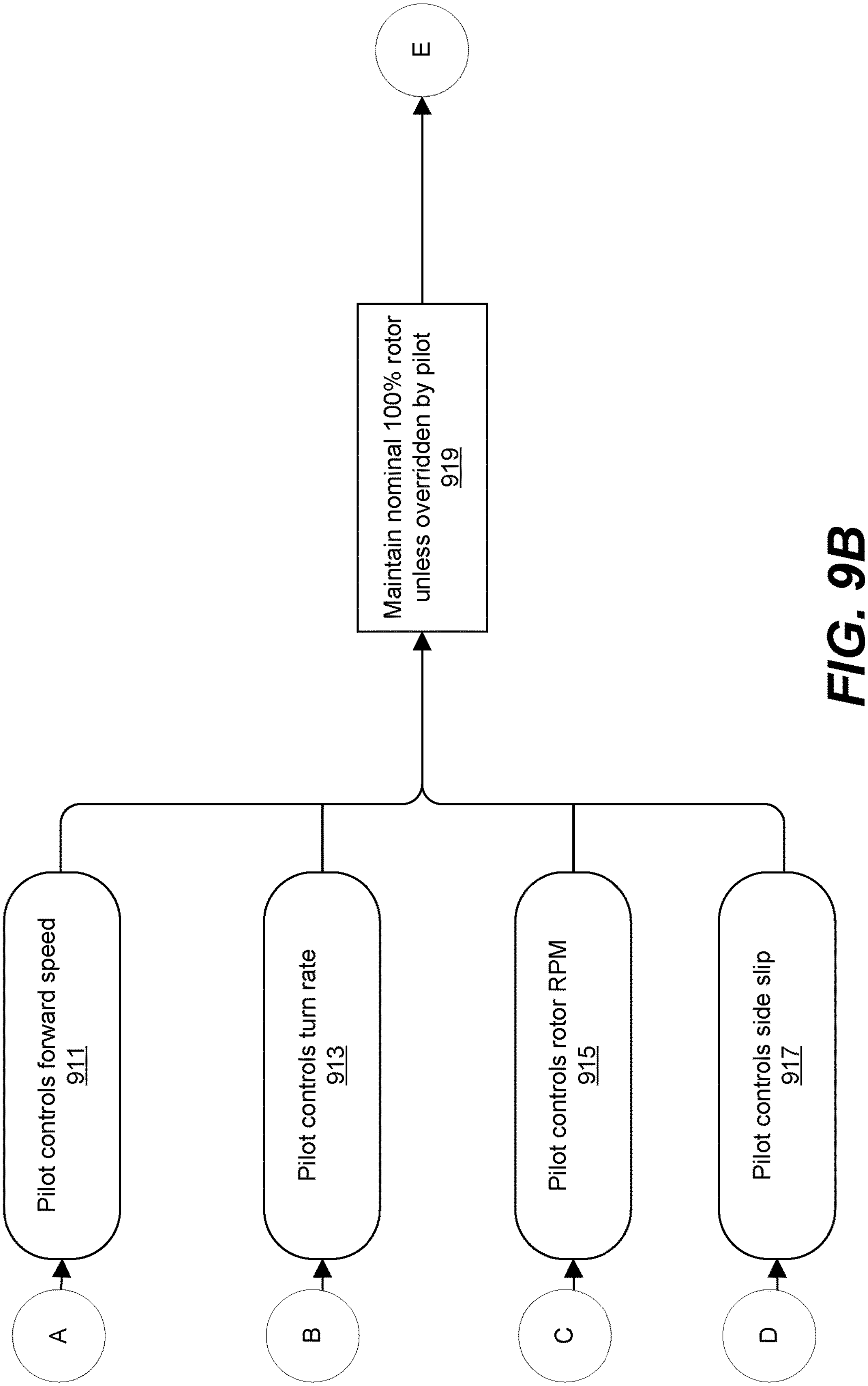
Figure 9C:
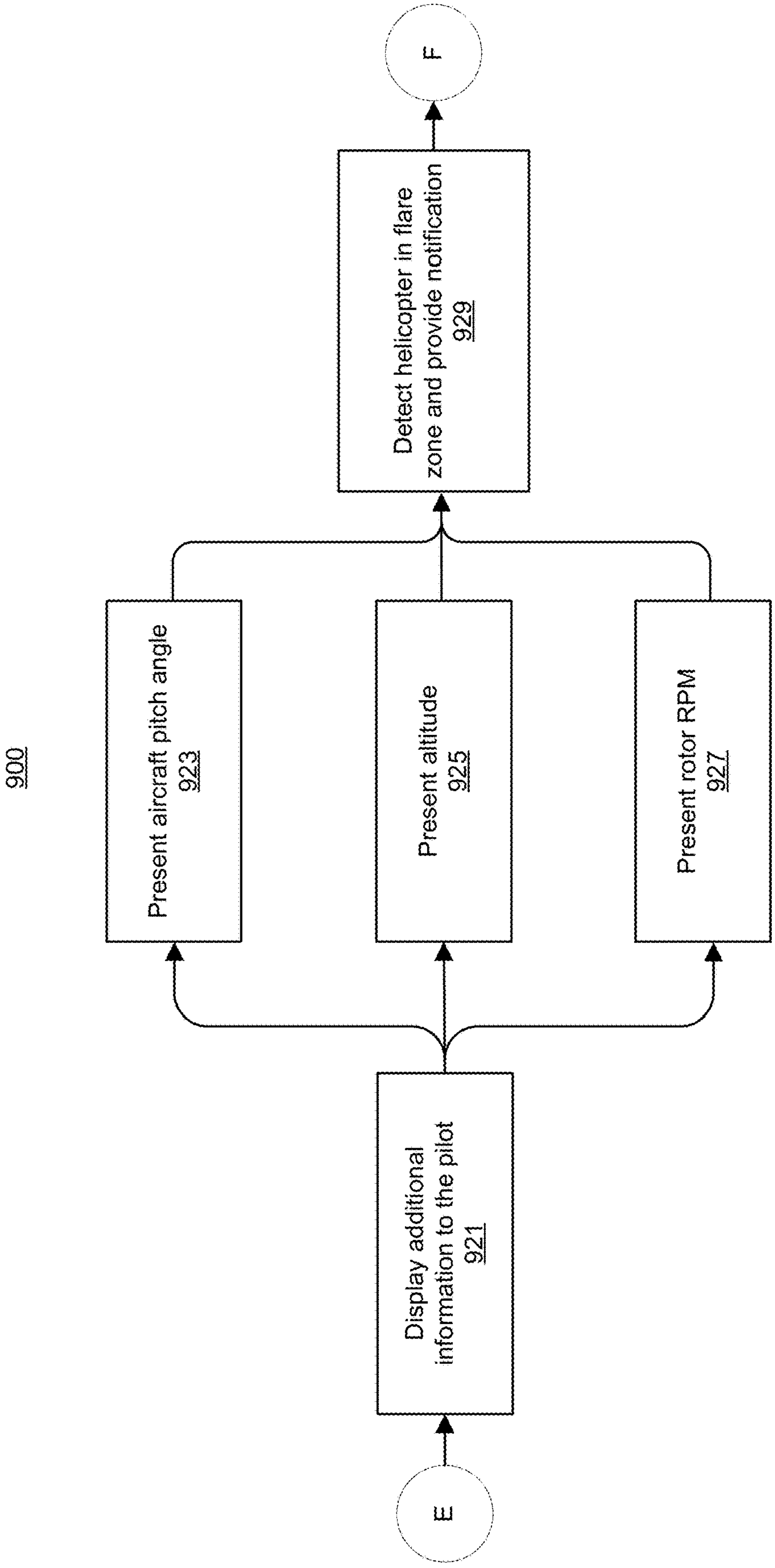
Figure 9D:
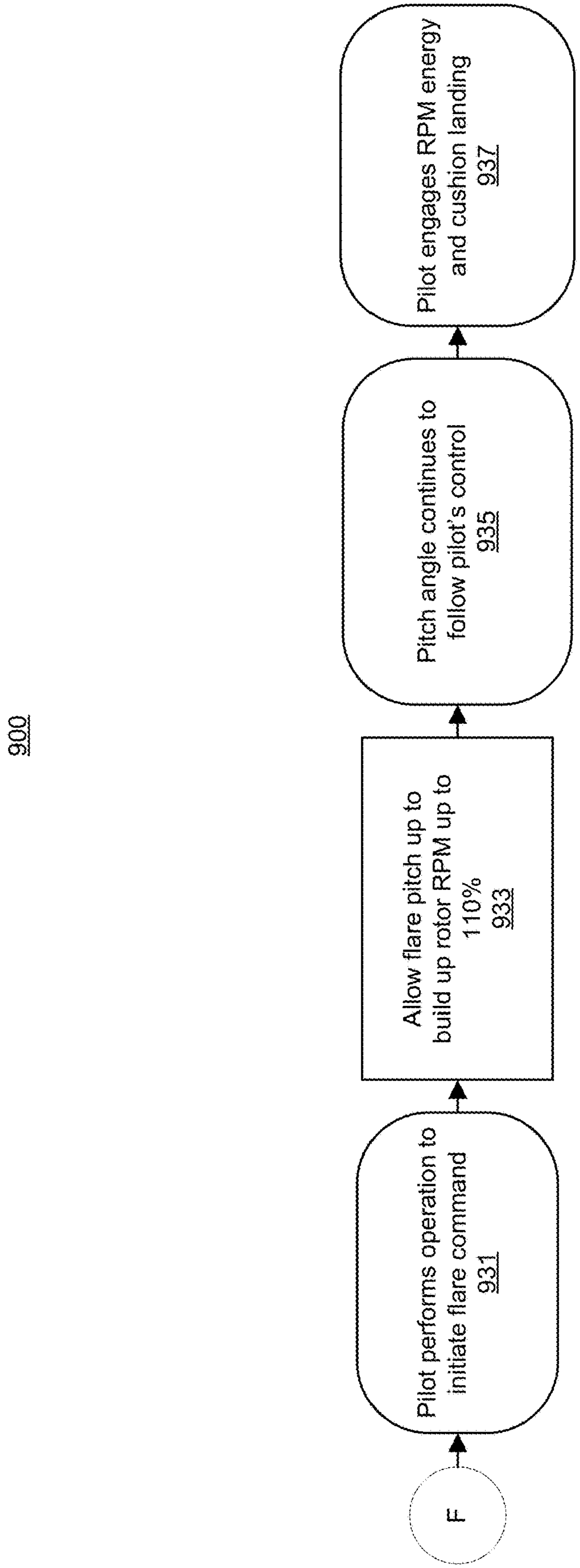

FIG. 8F is an example fifth interface 825 that may be displayed to a user (e.g., via 210), according to some embodiments. Interface 825 may be displayed on a multi-function display (e.g., adjacent to or near to a primary flight display). The interface 825 includes tabs across the top of the interface that allow the user to access functions grouped according to category. In the example of FIG. 8F, the middle section 827 of interface 827 is displaying alerts that may be important for the user. In some embodiments, the alerts tab is automatically selected (thus displaying alerts of the alerts tab) when a new alert is triggered. In the middle section 827, the alerts are displayed in a scrollable list and ordered according to importance. They are also color coded and grouped according to importance. Alerts in the "warning" category are most important and may include red indicators and red text. The first warning alert includes the following text from left to right: "Engine Fire"; "Possible fire in the engine compartment"; and "Immediately enter an autorotation-Land immediately." The second warning alert includes the following text from left to right: "Main Rotor Temp/Press"; Excessive temperature or low oil pressure in main gearbox"; and "Land immediately." Alerts in the "cautions" category are less important than the warning category and may include yellow indicators and text. The caution alert includes the following text from left to right: "No Comm with VHF"; "No Communication with the VHF radio"; and "Be aware-degraded condition." Alerts in the "advisories" category are less important than the cautions category and may include green indicators and text. The advisory alert includes the following text from left to right: "Check Navaid identifier" and "Decoded navaid identifier did not match approach navaid." Each alert includes a title (e.g., "Engine Fire"), a brief explanation of the alert (e.g., "Possible fire in the engine compartment"), and an overall action an entity (e.g., the user) should perform in response to the alert (e.g., "Immediately enter an autorotation-Land immediately"). Among other advantages, the alerts in the middle section 827 provide a user with clear information that allows the user to quickly assess the situation and determine how to user the vehicle appropriately.

Additionally, the interface 825 includes a left section 826 with a list of steps to perform to respond to one or more alerts in the middle section 827. In the example of FIG. 8F, the left section 826 includes steps to respond to an engine fire during flight. Among other advantages, the user does not need to remember which steps to perform to respond to an engine fire, they may simply follow the steps in the list. Furthermore, the list indicates which steps may or are performed by the system (e.g., system 100 or emergency module 160). In the example of FIG. 8F, the steps automatically performed by the system start with the label "[System]."

Interface 825 is in sharp contrast to traditional systems, which, in the example of an engine fire, simply include a single "engine fire" light that turns on. In these traditional systems, the user must manually remember the implications of the "engine fire" light, remember the proper steps to perform and then execute the next steps.

Additional Details on Emergency Management

Among other advantages, the emergency module 160 works even if one or more subsystems fail or are compromised (e.g., due to an emergency event), in addition to (or alternative to) the user being incapacitated. Said differently, the emergency module 160 is operational even if the vehicle is in a degraded state. Example failures include an engine failure, tail rotor failure, landing gear failure, radar failure, and GPS failure. For example, in some embodiments, to conduct autorotation the emergency module 160 only uses input from a control interface (e.g., control-stick), a set of IMUs, a set of air-data sensors, and a set of rotor RPM sensors (e.g., these are the only items that are absolutely needed for autorotation). In another example, in some embodiments to conduct an automated landing (e.g. where the user can pick a landing spot), GPS will be needed.

In some embodiments, the emergency module 160 may include functionalities for parachutes (for emergency landings). Conventionally, to employ a parachute for an air vehicle, a user must manually release the parachute. However, there many downsides to this. If the vehicle is moving too fast, the parachute may tear off form the vehicle. If the vehicle is too low to the ground, the parachute may not slow the vehicle down enough before the vehicle makes ground contact. Furthermore, even if a parachute is released at the proper time, the air vehicle may land at a dangerous location.

Among other advantages, the emergency module 160 provides parachute functionalities. In one example embodiment, the parachutes may be applied for fixed wing aircraft. Since the emergency module 160 knows the vehicle state, the emergency module 160 may determine when to release the parachute. In some embodiments, the emergency module 160 determines when the parachute can be deployed based on the height above the ground, vertical speed of the vehicle, and forward speed of the vehicle. The emergency module 160 may automatically release the parachute (an example of a non-user corrective action) or inform the user when they should release the parachute. If parameters of the vehicle should be modified before the parachute is, the emergency module 160 may automatically control the vehicle (or provide instructions to the user) so the parameters are modified. For example, if the vehicle altitude is too low to deploy the parachute (e.g., the parachute won't sufficiently slow the descent rate of the vehicle), the emergency module 160 may trigger engine (one or more) thrust, which may be reserve engine thrusters, and/or adjust aircraft wing flaps to direct the vehicle to a higher altitude that is within an envelope to enable safe deployment of the parachute. The trigger may be based upon vehicle condition and operational considerations as well as environmental considerations (e.g., wind speed, atmospheric conditions) to determine the adjustments to make to the electrical and mechanical systems (e.g., engine thrust and/or flap positions).

In another example, if the vehicle is moving too fast to deploy the parachute, the emergency module 160 may direct the vehicle such that the vehicle speed decreases. For example, if engine thrust (or reserve thrusters) is operational, the engine may be signaled to generate thrust and/or aircraft flaps are deployed such that the rate of descent is slowed to within an acceptable operational envelope for deployment of the parachute.

In another example, if the vehicle will land at an undesirable location (e.g., in the middle of the ocean), the emergency module 160 may direct the vehicle before the parachute is released so that the vehicle will eventually land at a more desirable location (e.g., in the ocean but within swimming distance of the shore). For example, if engine thrust (or reserve thrusters) is operational, the engine may be signaled by a guidance and navigation system to identify a safe landing area. The guidance and navigation system may calculate aircraft parameters such as rate of drop and available thrust energy and/or flap deployment range as well as environmental factors such as wind speed and atmospheric conditions. The calculations are used to control the vehicle (e.g., via 335) such that the aircraft descends to the calculated location after the parachute is deployed. In the above examples, the emergency module 160 'directing' the vehicle refers to both automatically controlling the vehicle (non-user actions) and providing control instructions to the user (examples of notifying a user of user actions e.g., step 735).

The emergency module 160 may make landing determinations based on specifics of the air vehicle. For example, if a vehicle has retractable landing gear, the emergency module 160 may identify this and direct the vehicle to land on a body of water based on this identification. Conversely, if the vehicle does not have retractable landing gear (or the landing gear is not operational (e.g., extended and jammed), it may be unsafe to land in certain environments such as on water. The emergency module 160 may identify the extended landing gear and direct the vehicle so it does not land on the water or so that the vehicle releases a parachute before landing on the water. In the above examples, the emergency module 160 'directing' the vehicle refers to both automatically controlling the vehicle (non-user actions such as triggering engine thrust and/or maneuvering the flaps) and providing control instructions to the user (examples of notifying a user of user actions e.g., step 735).

Autorotation

Among other features, the emergency module 160 may assist a user with autorotation of a rotorcraft. Among other advantages, the emergency module 160, dramatically reduces the workload of the user during autorotation, thus making an autorotation easier and safer to perform. More specifically, the emergency module 160 automates some steps of an autorotation procedure while still giving the user agency over the rotorcraft. This allows the user to focus on other (e.g., more important) steps of the autorotation procedure, such as maneuvering the rotorcraft. For example, the emergency module 160 controls the main rotor RPM so it is within the ideal RPM range for autorotation while the user maneuvers the rotorcraft. In some embodiments, the emergency module 160 is capable of automating all steps of an autorotation procedure (e.g., if the user becomes incapacitated).

In a first example, the emergency module 160 may assist a user with a safe autorotational descent and a safe autorotational landing. When the emergency module 160 detects an autorotation condition (e.g., an engine failure, loss of tail rotor thrust (e.g., due to a bird strike), power governor failure, user-initiated autorotation, or training autorotation), the emergency module 160 may automatically enter the air vehicle into an autorotation descent profile. As indicated above, the user has the ability to initiate an autorotation at their discretion (e.g., there is an engine fire in flight and the user decides to enter an autorotation). The user may initiate an autorotation using with a thumbwheel (an example of a control interface 110 and e.g., as described with respect to FIG. 5) and one or more button presses in an "Emergency" tab of an interface (e.g., on 220). In some embodiments, after the autorotation is initiated, the emergency module 160, manages the RPM (rotations per minute) of the main rotor blade according to the limitations of the rotorcraft. For example, the emergency module 160 maintains the rotations per minute (RPM) between high and low autorotation RPM thresholds. The user may retain flight control agency during this process. For example, the user uses a side stick controller (another example of a control interface 110) to control the rotorcraft and a vertical thumb lever (another example of a control interface 110) to control the RPM (e.g., within appropriate flight manual limitation ranges). As the vehicle descends, minimum and maximum rotor RPM limits are (e.g., continually) managed by emergency module 160 to reduce (e.g., minimize) user workload. The emergency module 160 may also provide the user with useful information such as the forward speed and rate of descent of the rotorcraft. The emergency module 160 may help the user be aware of a proper flare envelope by displaying appropriate visual or aural notifications. This may help the user determine when to initiate a flare maneuver. When the user initiates the flare maneuver (e.g., with the side stick controller), the user may have full control during the level, aircraft cushion, and landing stages.

In a second example, the emergency module 160 may assist a user with a safe hovering autorotation descent and a safe landing. In these cases, when the emergency module 160 detects an autorotation condition (e.g., an engine failure or loss of tail rotor thrust (e.g., jammed tail rotor)) while the rotorcraft is in a hover at or below a threshold height (e.g., eight feet above ground level (AGL)), the emergency module 160 may initiate a hovering autorotation that attempts to maintain heading to prevent yaw. If this autorotation condition occurs in lateral flight, the emergency module 160 may attempt to align heading with the aircraft velocity vector to prevent dynamic rollover. The user may then allow the rotorcraft to settle and then increase the vertical thumb lever just before touchdown to cushion the landing.

In a third example, the emergency module 160 allows the user to perform an autorotation training scenario or practice autorotation (e.g., during user training, check rides, and practice maneuvers). In some embodiments, practice autorotations are not executed to the ground and thus include minimum altitude protection (e.g., if the rotorcraft descends below an altitude threshold, the emergency module 160 exits the autorotation).

As previously mentioned, FIG. 8C is an example third interface 815 that may be displayed to a user, according to some embodiments. Interface 815 may be displayed on a primary flight display (e.g., 210). Interface 815 includes crew alerts for a rotorcraft in autorotation. Crew alert 816 indicates there is tail rotor failure, and alert 819 indicates the user should land the vehicle as soon as possible. Alert 817 indicates the fuel flow sensor is low. Alert 818 indicates the user should prepare to flare the rotorcraft.

FIGS. 9A-9D are a flowchart of a method 900 for performing an autorotation in a rotorcraft with the emergency module 160, according to an embodiment. In the example of FIGS. 9A-9D, steps enclosed by a rectangle may be (e.g., automatically) performed by the emergency module 160 and steps enclosed by an oval may be performed by the user. The method 900 can include greater or fewer steps than described herein. Additionally, the steps may be performed in a different order and one or more steps may be performed multiple times.

Steps 905A, 905B, 905C are example conditions that trigger the emergency module 160 to enter into autorotation (step 907). At step 905A, the emergency module 160 detects a failure event (e.g., an engine failure (e.g., the tail rotor losses thrust)). At step 905B, the user pulls the fuel cutoff (e.g., due to a fire). At step 905C, the user initiates an autorotation (e.g., to perform a practice autorotation).

At step 907, responsive to any of steps 905A-C occurring (or any other autorotation condition occurring), the emergency module 160 enters into an autorotation. Part of step 907 may include the emergency module 160 putting the rotorcraft into an autorotation glide, thus alleviating the user of performing this potentially difficult stage of autorotation. In a rotorcraft, after a failure (e.g., an engine or transmission failure), autorotation must be entered quickly (e.g., before the rotor system loses momentum below a threshold value) to avoid a catastrophic outcome. The required time to enter autorotation (e.g., less than two seconds) may be less than the typical user reaction time to recognize the failure, mentally process it, and then provide the correct control inputs to enter autorotation. Thus, among other advantages, the emergency module 160 can detect failures that require autorotation and can initiate the proper control inputs to enter the autorotation glide faster than a human user.

The remaining steps of the method 900 are steps that may occur during autorotation.

At step 909, the emergency module 160 allows the user to use control inputs (e.g., a stick) to maneuver the rotorcraft (e.g., to affect the glide path). In some embodiments, step 909 can be performed autonomously (e.g., if the user is unconscious). Steps 911-917 describe example ways the user can control the rotorcraft during autorotation.

At step 911, the user controls the velocity (e.g., within the envelope, non-persistent). The pitch may be controlled by longitudinal deflection of the side stick controller. For example, pushing forward on the side stick controller pitches the nose down and increases airspeed (the airspeed may be displayed to the user via a display). At step 913, the user controls the turn rate (e.g., within the envelope, non-persistent). The turn rate may be controlled by lateral deflection of the side stick controller. At step 915, the user controls the rotor RPM (e.g., within the envelope, non-persistent). The user may control the RPM using a vertical thumb lever. For example, rolling the vertical thumb lever up decreases the rotor RPM, thus decreasing the descent rate, and rolling the vertical thumb lever down increases the rotor RPM, thus increasing the descent rate. The descent rate may be displayed to the user via a display. At step 917, the user can control the side slip. The user may control the side slip with the side stick controller.

At step 919, the emergency module 160 maintains nominal 100% rotor (unless overridden by the user). The RPM can be changed from 100% (e.g., commanded to 98% or 101%) to either increase or decrease the rate of descent. Note that in some contexts RPM is referred to as the actual RPM value and in other contexts as a percent relative to what is deemed a nominal value in powered flight. During descent, the emergency module 160 may also manage speed, sideslip, heading or some combination thereof (note that any of these may also be modified by the user, if needed).

At step 921, the emergency module 160 presents additional information to the user to help the user perform the autorotation. Steps 923-927 describe example information that may be displayed during autorotation. Limits that exist in powered flight but are no longer applicable during autorotation may be removed. For example, no dynamic limits (e.g., barberpole) are displayed to the user for airspeed or for vertical speed.

At step 923, the emergency module 160 presents the pitch angle (e.g., with a defined pitch envelope) of the rotorcraft. At step 925, the emergency module 160 presents the altitude of the rotorcraft (e.g., the Above Ground Level (AGL), which may be determined using radar). At step 927, the emergency module 160 presents the rotor RPM (e.g., in the envelope between 90% and 110% (in this context, RPM is a percent relative to a nominal value in powered flight).

At step 929, the emergency module 160 detects the rotorcraft is the flare zone and, responsive to this, notifies the user. For example, the emergency module 160 provides an aural notification, such as a chime or an annunciation that the rotorcraft is in the flare zone. The emergency module 160 may determine the rotorcraft is the flare zone based on altitude, current speed, and the minimum time it would take to reduce rotorcraft forward velocity to a safe speed to perform a landing.

At step 931, the user performs an operation to initiate a flare command. The flare command triggers the emergency module 160 to enter into a flare state. The operation may include the user pulling back on the stick past a threshold deflection (the "flare threshold"). The user can toggle off the flare state by performing another operation (e.g., pressing a command button in a user interface). During a flare state, rotor RPM is allowed to build so the vehicle is slowed to a safe landing velocity. The flare state is distinct from the glide state, during which rotor RPM is maintained to keep speed (the intent is not to build RPM but keep it within a nominal envelop).

At step 933, in the flare state, the emergency module 160 allows the flare pitch up to build up or maintain rotor RPM up to a threshold (e.g., 110%).

At step 935, the pitch angle continues to follow the user's control (e.g., longitudinal side stick controller deflection) (within envelope) while continuing to allow the user to control other maneuvers, such as turn rate, bank rate, and side slip.

At step 937, the user uses a control interface (e.g., rolls up the vertical thumb lever) to engage the built-up rotor RPM energy to cushion the landing at final setdown.

While the steps of method 900 are illustrated as sequentially occurring in order, this is not required. For example, after autorotation begins (step 907), the user may have agency to control the rotorcraft (steps 909-917) while other steps occur. Similarly, information may be presented to the user (steps 921-927) while other steps occur (e.g., information is presented after autorotation begins at step 907).

Additional Examples for Autorotation

Additional details of an autorotation are further described below. Some details of the below descriptions may be repetitive in view of the previous descriptions. Any of the descriptions, features, embodiments, and examples described below may be incorporated into any of the descriptions, features, embodiments, and examples previously described.

An autorotation may be initiated due to any number of different emergency events for aircraft with rotors (which may include rotary blades) (e.g., helicopter), such as a failed main rotor and/or failed tail rotor. Generally, an autorotation may be triggered for an emergency event that necessitates landing the air vehicle quickly (e.g., immediately or as quickly as possible). The emergency module 160 may identify such an emergency event by analyzing data from sensors of the air vehicle (e.g., determining (e.g., via detection) an engine failure by identifying decreasing rotor torque or determining an inability to generate torque necessary to drive the rotor). In response, the emergency module 160 may automatically enter into an autorotation, notify the user that the air vehicle is experiencing an engine failure and should enter into an autorotation, or both.

An autorotation may also be initiated by the user by interacting with the OS (e.g., see FIG. 8D). For example, the user initiates an autorotation in a practice session or because the air vehicle experienced an emergency event undetected by the emergency module 160 (e.g., a failure occurs that sensors cannot detect, such as an incapacitated user (e.g., pilot), cabin fire, or bird strike on the cabin).

To enter into an autorotation, the emergency module 160 may invert the pitch of the main rotor blades, resulting in upward air movement that rotates the rotor blades. Among other advantages, the autorotation of the rotor blades slows down the air vehicle as it descends. Furthermore, inverting the pitch of the rotor blades helps maintain rotor RPM within a predetermined envelope range (e.g., RPM within 80%-100%). If the RPM drops below the envelope range, the air vehicle may stall, possibly resulting in a crash landing. To continue maintaining RPM in the envelope range during autorotation (thus helping prevent a stall), the emergency module 160 may dynamically adjust the pitch angle of the rotor blades. The emergency module 160 may consider other factors as well. For example, there may be a desired nominal airspeed range to help stabilize RPM. Thus, the emergency module 160 may control the vehicle (e.g., dynamically adjust the pitch angle of the rotor blades) so the vehicle's speed stays in the nominal airspeed range. In another example, the emergency module 160 may (e.g., automatically) manage the change in torque introduced into the system when the engine goes idle. The specific pitch angles of the rotor blades may be determined and updated in real time by an algorithm e.g., a feedback control loop.

The first stage of an autorotation is the glide stage, during which the air vehicle glides forward and downward. During the glide stage, the user can control the air vehicle, such as direction, descent rate, forward speed, and RPM. However, the emergency module 160 may prevent the air vehicle from exiting the glide envelope (e.g., allowing the rotor RPM to decrease below the envelope range). The emergency module 160 may adjust the allowable operations available to the user so that the air vehicle stays within the envelope. In some embodiments, the emergency module 160 applies boundaries on maneuver operations the user is allowed to perform. Additionally, or alternatively, if there are excursions beyond the envelope due to environmental factors, the emergency module 160 may drive the vehicle back into the envelope. These actions may be referred to as 'dynamic envelope protection.' Among other advantages, this reduces the burden of the user paying attention to the envelope parameters.

Based on altitude determinations, the emergency module 160 may calculate a window when the flare should be performed. The emergency module 160 may inform the user of this window e.g., audibly or visually alerting the user when they should perform the flare. Among other advantages, this increases the likelihood that user will perform the flare maneuver at the right time.

When the flare is performed (or shortly before) (e.g., when the user initiates the flare), the emergency module 160 may automatically rotate the rotor blades to flip the pitch to manage upward thrust for the flare maneuver. For example, the user simply pulls the control stick backwards to perform the flare. The rotor pitch may be changed based on user input or the emergency module 160 managing RPM.

After the flare, the user may have at least some control of the air vehicle to control the landing (e.g., the user may control the RPM decay during landing to control how soft or hard the landing is).

The emergency module 160 may allow the user to select the landing type for an autorotation landing. For example, the user can select between a "run-on landing" or a "vertical landing," and then assist in controlling the air vehicle based on the selection. For a run-on landing, the vehicle continues to move forward after the flare and it hits the ground moving forward (like a fixed wing aircraft). The landing type selection option allows the user to assess the landing location and make selection based on that. For example, an airstrip is a good place for a run-on landing but untested ground, such as grass may be better for a vertical landing (or if there is an obstacle e.g., tree that would prevent a run-on landing). In some embodiments, a functioning tail rotor may be required to perform a run-on landing (e.g., to keep the air vehicle aligned with the forward motion). In those embodiments, if the tail rotor is not functioning properly, the user may not have the option to select a run-on landing.

In the above descriptions, the emergency module 160 is configured to generate instructions that help the user operate the air vehicle during stages of an autorotation. In other words, the emergency module 160 made performing an autorotation easier for the user. But the user was still in control of the air vehicle and was still able to apply decisions to control aspects of the aircraft, e.g., the user may control the vehicle during the glide, flare, and landing stages. In some embodiments, the emergency module 160 can partially or fully automate any stage of an autorotation, as further described below.

For example, in some embodiments, the user simply selects a landing location or a landing type. In these embodiments, the emergency module 160 may determine a set of possible landing locations for an autorotation and presents these locations to the user for selection via a UI. These locations may be determined based on a terrain map, safety envelope of the aircraft, and environmental conditions (e.g., weather conditions). The user may select based on their knowledge of the locations (e.g., airstrip vs empty field vs beach). If the user does not touch an exact location on the user interface, the selection may auto select the nearest location.

The emergency module 160 may additionally, or alternatively, allow the user to select a landing type. The available landing types may be based on the ground type of the landing location. After those selections, the emergency module 160 may control the air vehicle so that it performs an autorotation (e.g., including controlling the vehicle during the glide, flare, and landing stages) and lands at the selected location and by the selected landing type. In some embodiments, the emergency module 160 automatically selects the landing location or landing type. For example, if no user input is provided for the landing location in a threshold among of time (e.g., 10 s), the emergency module 160 may automatically select a landing location based on various criteria. Thus, if the user is incapacitated or distracted, emergency module 160 may still perform the autorotation. Similarly, if no user input is provided in a threshold amount of time for the landing type, the emergency module 160 may automatically select the landing type of landing based on criteria e.g., the ground type at the landing location. In these examples, if no user input is provided by the threshold time, the emergency module 160 may determine the user is incapacitated and then perform the autorotation input from the user. However, if the user provides selections during the threshold time, the emergency module 160 may allow the user to control the vehicle during autorotation.

In some embodiments, the emergency module 160 includes a planning tool that allows a user to indicate that, if an autorotation should be performed during the flight, they want the air vehicle to be able to perform an autorotation and land at locations that meet certain criteria (e.g., if an autorotation is performed, the user wants the air vehicle to only land at "safe" landing locations, such as airports or landing strips). If the user provides this indication, the emergency module 160 may identify emergency landing locations between the departure and arrival locations that meet the criteria and then select a flight plan, velocity, etc. so that, during the flight, if an autorotation should be performed, the vehicle may (e.g., always) be able to land at (at least) one of the identified emergency landing locations.

Figure 10:
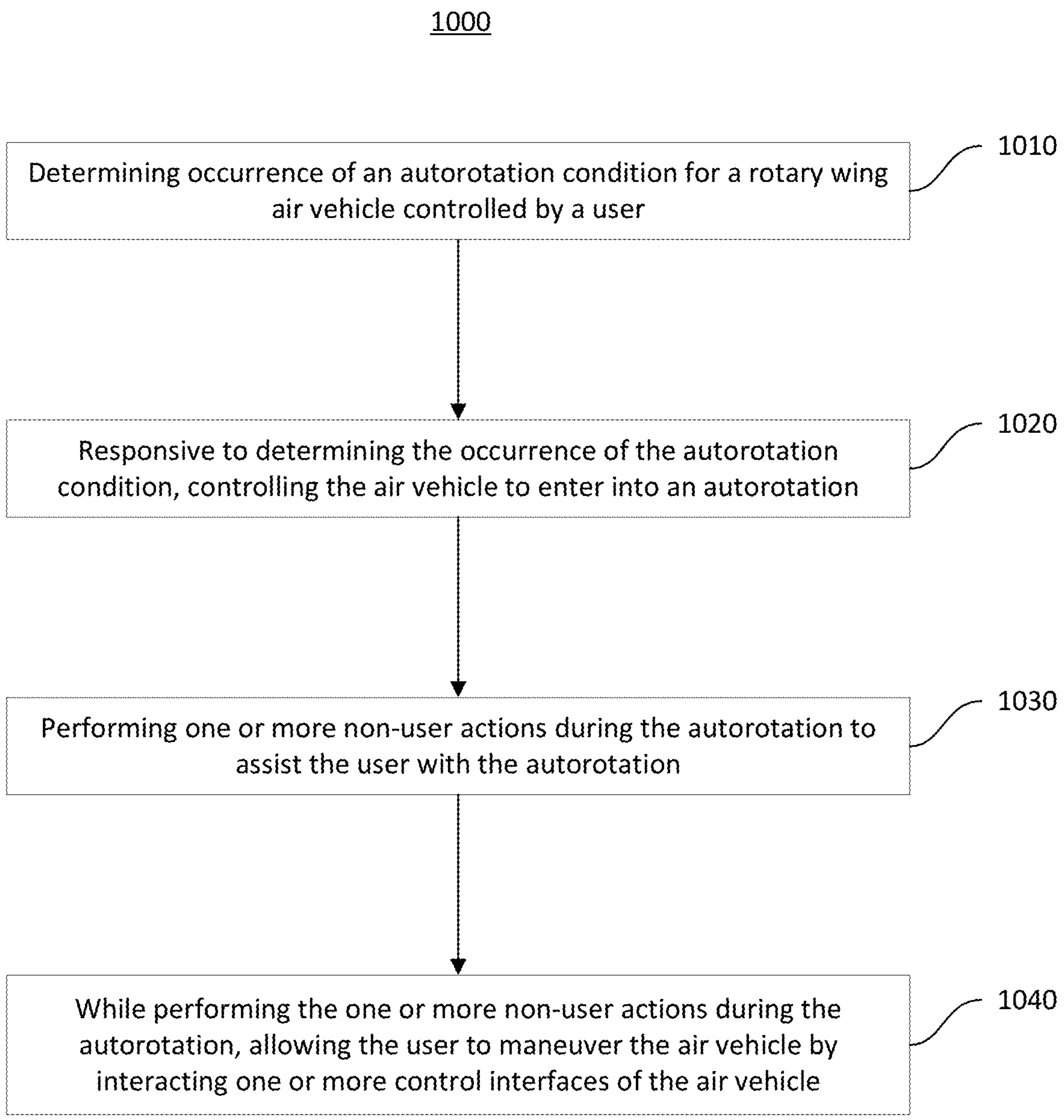
FIG. 10 is a flowchart of a method for performing an autorotation for a rotary wing air vehicle, according to some embodiments.

FIG. 10 is a flowchart of a method 1000 for performing an autorotation for a rotary wing air vehicle, according to some embodiments. In the example of FIG. 10, the method 1000 is performed from the perspective of the emergency module 160. The method 1000 can include greater or fewer steps than described herein. Additionally, the steps may be performed in a different order. Any of the descriptions, features, embodiments, and examples previously described with respect to autorotation and emergency management may be incorporated into any of the descriptions, features, embodiments, and examples of the method 1000 described below.

At step 1010, the emergency module 160 determines occurrence of an autorotation condition for a rotary wing air vehicle controlled by a user. At step 1020, the emergency module 160, responsive to determining the occurrence of the autorotation condition, controls the air vehicle to enter into an autorotation. At step 1030, the emergency module 160 performs one or more non-user actions during the autorotation to assist the user with the autorotation. At step 1040, the emergency module 160, while performing the one or more non-user actions during the autorotation, allows the user to maneuver the air vehicle by the user interacting with one or more control interfaces of the air vehicle (e.g., 110).

Optionally, controlling the air vehicle to enter into the autorotation comprises controlling the air vehicle to enter into an autorotation glide. Optionally, controlling the air vehicle to enter into the autorotation is performed automatically without input from the user. Optionally entering into the autorotation comprises inverting rotor blades of a rotor of the air vehicle. Optionally, performing the one or more non-user actions includes maintaining an RPM of a rotor of the air vehicle. Optionally, performing the one or more non-user actions includes maintaining an airspeed of the air vehicle to a range of nominal values (e.g., unless indicated otherwise the user). Optionally, maintaining the RPM of the rotor comprises maintain the RPM of the rotor between high and low autorotation RPM thresholds. Optionally, maintaining the RPM of the rotor of the air vehicle comprises dynamically adjusting a pitch angle value of a rotor blade of the rotor. Optionally, the pitch angle value of the is dynamically adjusted using a feedback control loop. Optionally, the autorotation condition includes at least one of: an engine failure; loss of tail rotor thrust below a threshold; a fire in or on the air vehicle; a power governor failure; or a user-initiated autorotation. Optionally, performing one or more non-user actions during the autorotation to assist the user with the autorotation comprises preventing the user from maneuvering the air vehicle outside of a security envelope. Optionally, allowing the user to maneuver the air vehicle includes allowing the user to control at least one of: a forward speed of the air vehicle; a descent rate of the air vehicle; a turn rate of the air vehicle; a yaw of the air vehicle; a pitch of the air vehicle; a roll of the air vehicle; an RPM of a rotor of the air vehicle; or a side slip of the air vehicle. Optionally, the method 1000 further comprises, responsive to determining the air vehicle is below a threshold height from the ground, notifying the user to perform a flare maneuver. Optionally, the method 1000 further comprises, during a flare maneuver, automatically inverting rotor blades of a rotor of the air vehicle. Optionally, the autorotation condition occurs while the air vehicle is at or below a threshold height from the ground. Optionally, the air vehicle is controlled to enter into a hovering autorotation. Optionally, the method 1000 further comprises: responsive to determining the air vehicle is moving laterally, controlling the air vehicle to turn toward a velocity vector to prevent the air vehicle from rolling over. Optionally, the method 1000 further comprises, subsequent to receiving an autorotation landing type indication, controlling one or more non-user actions to assist the user in landing the air vehicle according to the landing type indication. Other aspects include components, devices, systems, improvements, methods, processes, applications, computer readable mediums, and other technologies related to any of the above.

Example Process for Converting Universal Control Inputs to Vehicle Commands

Figure 11:
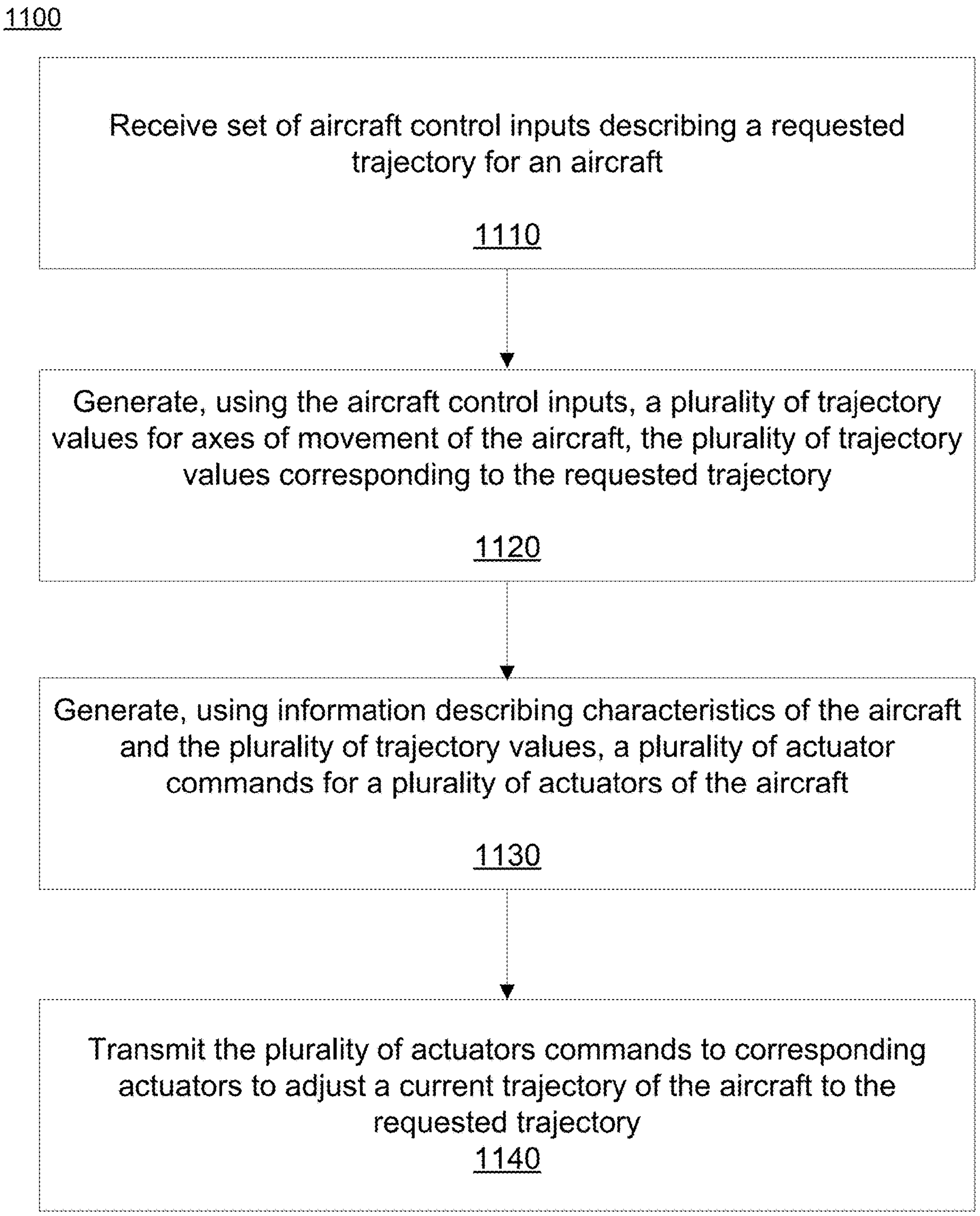
FIG. 11 is a flow diagram illustrating one example embodiment of a process for generating actuator commands for aircraft control inputs via an aircraft control router.

FIG. 11 is a flow diagram illustrating one embodiment of a process 1100 for generating actuator commands for aircraft control inputs via an aircraft control router. In the example embodiment shown, the aircraft control router is illustrated performing the steps of the process 1100. However, some or all of the steps may be performed by other entities or components. In addition, some embodiments may perform the steps in parallel, perform the steps in different orders, or perform different steps. The aircraft control router may be an embodiment of the universal vehicle control router 120, such as the universal aircraft control router 310. Furthermore, the aircraft control router may be integrated with one or more computer systems, such as the computer system 1100 described with reference to FIG. 12.

The process 1100 includes the aircraft control router, e.g., 310, receiving 1110 aircraft control inputs describing a requested trajectory for an aircraft from. For example, a human operator of an aircraft may provide the aircraft control inputs via one of the aircraft interfaces 305. The aircraft control inputs may include one or more of a forward speed control input, a lateral speed control input, a vertical speed control input, or a turn control input, e.g., as described above with reference to FIGS. 4 and 5.

The process 1100 includes the aircraft control router, e.g., 310, generating 1120, using the aircraft control inputs, a plurality of trajectory values for axes of movement of the aircraft, the plurality of trajectory values corresponding to the requested trajectory. For instance, the aircraft control router may convert the aircraft control inputs to corresponding trajectory values for axes of movement of the aircraft. As an example, if the aircraft control inputs include some or all of a forward speed control input, a lateral speed control input, a vertical speed control input, or a turn control input, the aircraft control router may determine one or more of a corresponding aircraft x-axis velocity, aircraft y-axis velocity, aircraft z-axis velocity, or angular velocity about a yaw axis of the vehicle (e.g., a yaw).

The process 1100 includes the aircraft control router generating 1130, using information describing characteristics of the aircraft and the plurality of trajectory values, a plurality of actuator commands to control the plurality of actuators of the aircraft. The aircraft control router may apply a set of control laws to the plurality of trajectory values in order to determine allowable trajectory values for the axis of movement of the aircraft. The information describing characteristics of the aircraft may include various information, such as a model including parameters for the aircraft or an estimated state of the aircraft. Furthermore, the aircraft control router may convert the plurality of trajectory values to the plurality of actuator commands using one or both of an outer processing loop and an inner processing loop, as described above with reference to the universal aircraft control router 310.

The process 1100 includes the aircraft control router transmitting 1140 the plurality of actuators commands to corresponding actuators to adjust a current trajectory of the aircraft to the requested trajectory. Alternatively, or additionally, the aircraft control router may transmit some or all of the actuator commands to other components of the aircraft to be used to control relevant actuators.

Computing Machine Architecture

Figure 12:
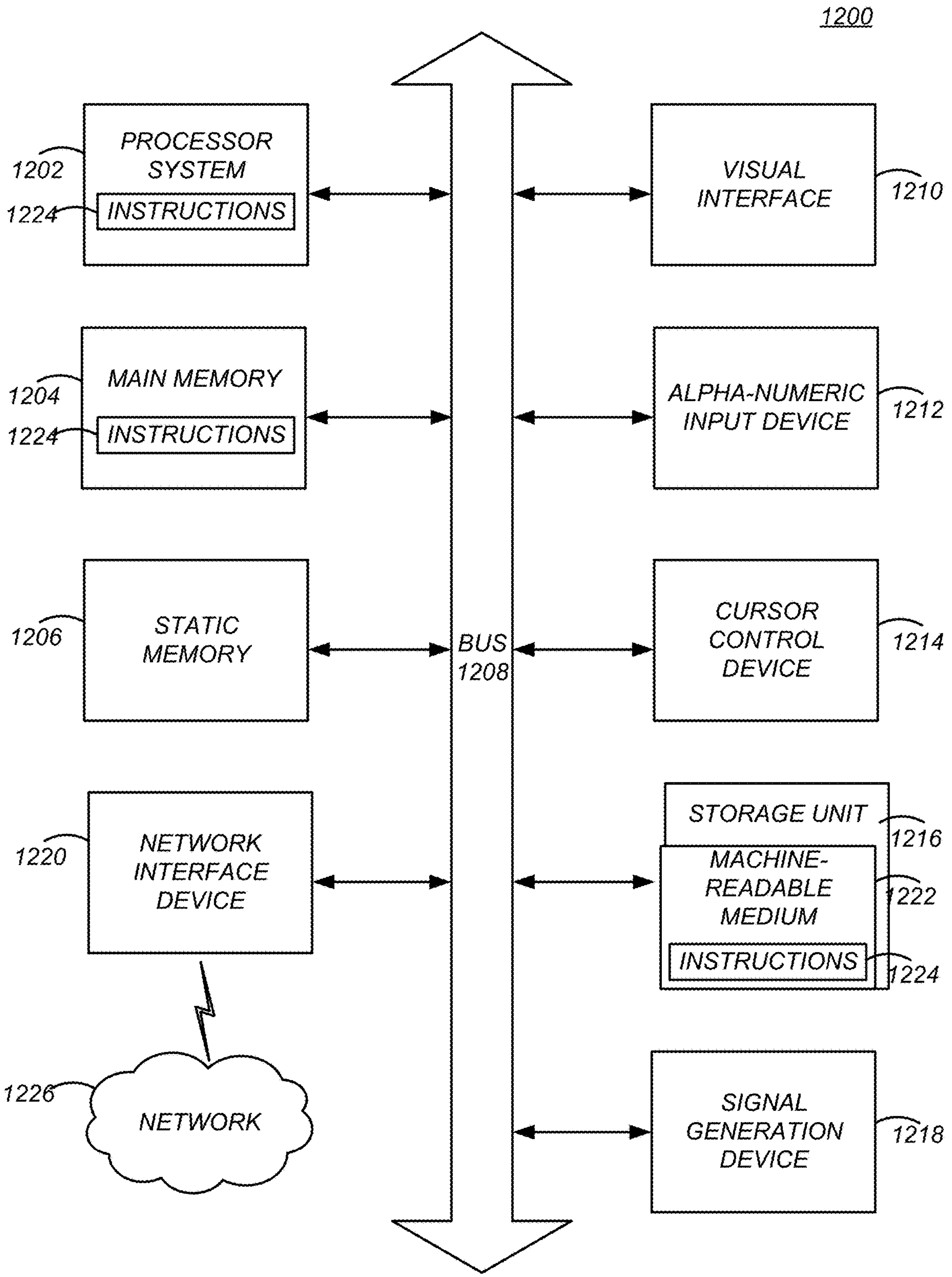
FIG. 12 is a block diagram illustrating one example embodiment of components of an example machine able to read instructions from a machine-readable medium and execute them in a processor (or controller).

FIG. 12 is a block diagram illustrating one embodiment of components of an example machine able to read instructions from a machine-readable medium and execute them in a processor system (or controller). Specifically, FIG. 12 shows a diagrammatic representation of a machine in the example form of a computer system 1200 within which program code (e.g., software) for causing the machine to perform any one or more of the methodologies discussed herein may be executed. The computer system 1200 may be used for one or more components of the vehicle control and interface system 100. The program code may be comprised of instructions 1224 executable (collectively or individually) by one or more processors of the processor system 1202. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 1224 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 1200 includes a processor system 1202 (e.g., including one or more central processing units (CPUs), one or more graphics processing units (GPUs), one or more neural processing units (NPUs), one or more digital signal processors (DSPs), one or more application specific integrated circuits (ASICs), one or more radio-frequency integrated circuits (RFICs), one or more field programmable gate arrays (FPGAs), or a combination thereof), a main memory 1204, and a static memory 1206, which are configured to communicate with each other via a bus 1208. The computer system 1200 may further include visual display interface 1210. The visual interface may include a software driver that enables (or provide) user interfaces to render on a screen either directly or indirectly. The visual interface 1210 may interface with a touch enabled screen. The computer system 1200 may also include input devices 1212 (e.g., a keyboard a mouse), a storage unit 1216, a signal generation device 1218 (e.g., a microphone and/or speaker), and a network interface device 1220, which also are configured to communicate via the bus 1208.

The storage unit 1216 includes a machine-readable medium 1222 (e.g., magnetic disk or solid-state memory) on which is stored instructions 1224 (e.g., software) embodying any one or more of the methodologies or functions described herein. The instructions 1224 (e.g., software) may also reside, completely or at least partially, within the main memory 1204 or within the processor system 1202 (e.g., within a processor's cache memory) during execution.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

determining, based on an engine torque of an air vehicle or rotations per minute (RPM) of a rotor of the air vehicle, occurrence of an autorotation condition for the air vehicle controlled by a user, wherein the air vehicle is a rotary wing air vehicle;

responsive to determining the occurrence of the autorotation condition, controlling the air vehicle to enter into an autorotation;

performing one or more non-user actions during the autorotation to assist the user with the autorotation, the one or more non-user actions comprising:

determining an airspeed of the air vehicle using vehicle sensors of the air vehicle, and maintaining an RPM of the rotor of the air vehicle based on the determined airspeed; and while performing the one or more non-user actions during the autorotation, allowing the user to maneuver the air vehicle by interacting with one or more control interfaces of the air vehicle.

2. The method of claim 1, wherein controlling the air vehicle to enter into the autorotation comprises controlling the air vehicle to enter into an autorotation glide.

3. The method of claim 1, wherein controlling the air vehicle to enter into the autorotation is performed automatically without input from the user.

4. The method of claim 3, wherein entering into the autorotation comprises inverting rotor blades of the rotor of the air vehicle.

5. The method of claim 1, wherein performing the one or more non-user actions includes maintaining an RPM of a rotor of the air vehicle.

6. The method of claim 1, wherein performing the one or more non-user actions includes maintaining an airspeed of the air vehicle to a range of predefined values.

7. The method of claim 1, wherein maintaining the RPM of the rotor comprises maintain the RPM of the rotor between high and low autorotation RPM thresholds.

8. The method of claim 1, wherein maintaining the RPM of the rotor of the air vehicle comprises dynamically adjusting a pitch angle value of a rotor blade of the rotor.

9. The method of claim 8, wherein the pitch angle value is dynamically adjusted using a feedback control loop.

10. The method of claim 1, wherein the autorotation condition includes at least one of:

an engine failure;

loss of tail rotor thrust below a threshold;

a fire in or on the air vehicle;

a power governor failure; or a user-initiated autorotation.

11. The method of claim 1, wherein performing one or more non-user actions during the autorotation to assist the user with the autorotation comprises preventing the user from maneuvering the air vehicle outside of a security envelope.

12. The method of claim 1, wherein allowing the user to maneuver the air vehicle includes allowing the user to control at least one of:

a forward speed of the air vehicle;

a descent rate of the air vehicle;

a turn rate of the air vehicle;

a yaw of the air vehicle;

a pitch of the air vehicle;

a roll of the air vehicle;

an RPM of a rotor of the air vehicle; or a side slip of the air vehicle.

13. The method of claim 1, further comprising, responsive to determining the air vehicle is below a threshold height from the ground, notifying the user to perform a flare maneuver.

14. The method of claim 1, further comprising, during a flare maneuver, automatically inverting rotor blades of the rotor of the air vehicle.

15. The method of claim 1, wherein the autorotation condition occurs while the air vehicle is at or below a threshold height from the ground.

16. The method of claim 15, wherein the air vehicle is controlled to enter into a hovering autorotation.

17. The method of claim 15, further comprising:

determining estimated 3D velocities of the air vehicle and an estimated heading of the air vehicle; and responsive to determining, based on the estimated 3D velocities, the air vehicle is moving laterally;

determining, based on the estimated 3D velocities and the estimated heading, one or more actuator commands that adjust yaw and roll of the air vehicle, and controlling, using the one or more actuator commands, the air vehicle to turn toward a velocity vector to prevent the air vehicle from rolling over.

18. The method of claim 1, further comprising, subsequent to receiving an autorotation landing type indication, controlling one or more non-user actions to assist the user land the air vehicle according to the landing type indication.

19. A non-transitory computer-readable storage medium comprising stored instructions which, when executed by a computing system, cause the computing system to perform operations comprising:

determining, based on an engine torque of an air vehicle or an RPM of a rotor of the air vehicle, occurrence of an autorotation condition for the air vehicle controlled by a user, wherein the air vehicle is a rotary wing air vehicle;

responsive to determining the occurrence of the autorotation condition, controlling the air vehicle to enter into an autorotation using rotor blades of the rotor;

performing one or more non-user actions during the autorotation to assist the user with the autorotation, the one or more non-user actions comprising:

determining an airspeed of the air vehicle using vehicle sensors of the air vehicle, and maintaining an RPM of the rotor of the air vehicle based on the determined airspeed; and while performing the one or more non-user actions during the autorotation, allowing the user to maneuver the air vehicle by interacting with one or more control interfaces of the air vehicle.

20. A computing system comprising:

one or more processors; and a non-transitory computer-readable storage medium comprising stored instructions which, when executed by a the one or more processors, cause the one or more processors to perform operations comprising:

determining, based on an engine torque of an air vehicle or an RPM of a rotor of the air vehicle, occurrence of an autorotation condition for the air vehicle controlled by a user, wherein the air vehicle is a rotary wing air vehicle;

responsive to determining the occurrence of the autorotation condition, controlling the air vehicle to enter into an autorotation;

performing one or more non-user actions during the autorotation to assist the user with the autorotation, the one or more non-user actions comprising:

determining an airspeed of the air vehicle using vehicle sensors of the air vehicle, and maintaining an RPM of the rotor of the air vehicle based on the determined airspeed; and while performing the one or more non-user actions during the autorotation, allowing the user to maneuver the air vehicle by interacting with one or more control interfaces of the air vehicle.

* * * * *